(12) United States Patent
Collins et al.

(10) Patent No.: US 10,984,394 B2
(45) Date of Patent: Apr. 20, 2021

(54) WASTE MANAGEMENT SYSTEM

(71) Applicant: Environmental Data Systems, LLC, Akron, OH (US)

(72) Inventors: Daniel Paul Collins, Uniontown, OH (US); Douglas Yoder, Akron, OH (US); Raymond Lewis, New Franklin, OH (US); Michael Haritakis, Hudson, OH (US); Patrick Sullivan, University Heights, OH (US)

(73) Assignee: ENVIRONMENTAL DATA SYSTEMS, LLC, Akron, OH (US)

( * ) Notice: Subject to any disclaimer, the term of this patent is extended or adjusted under 35 U.S.C. 154(b) by 282 days.

(21) Appl. No.: 15/926,893

(22) Filed: Mar. 20, 2018

(65) Prior Publication Data

US 2018/0268379 A1 Sep. 20, 2018

Related U.S. Application Data

(60) Provisional application No. 62/473,897, filed on Mar. 20, 2017.

(51) Int. Cl.
*G06Q 10/00* (2012.01)
*G06Q 10/08* (2012.01)
(Continued)

(52) U.S. Cl.
CPC .......... *G06Q 10/30* (2013.01); *G06F 16/258* (2019.01); *G06Q 10/0635* (2013.01); *G06Q 10/0832* (2013.01); *G06Q 10/0838* (2013.01); *G06Q 10/1097* (2013.01); *G06F 3/0482* (2013.01); *H04L 67/30* (2013.01); *H04L 67/42* (2013.01); *Y02W 90/00* (2015.05)

(58) Field of Classification Search
CPC .... G06Q 10/30; G06Q 50/26; G06Q 10/0833; G06Q 10/0631; G06Q 30/0633; G06Q 10/0832; G06F 16/27; G06F 3/0482
See application file for complete search history.

(56) References Cited

U.S. PATENT DOCUMENTS

2004/0039587 A1* 2/2004 Horoshige ................ B09B 5/00
705/308
2005/0102173 A1* 5/2005 Barker ............. G06Q 10/06316
705/7.26

(Continued)

*Primary Examiner* — A. Hunter Wilder
(74) *Attorney, Agent, or Firm* — Cooper Legal Group, LLC

(57) ABSTRACT

One or more devices, systems and/or methods for managing waste are provided. For example, a waste profile may be generated, based upon inputs received from a first device via a profile interface of a waste data aggregation platform. An approval notice may be received, via an approval interface of the waste data aggregation platform, from a second device. Shipping information may be entered into a plurality of digital forms of a shipping documentation interface based upon the waste profile and/or one or more inputs received from the first device and/or the second device. A shipping order for shipment of the waste may be generated. One or more notifications corresponding to the shipment of the waste may be transmitted to one or more devices associated with the shipment. The waste profile may be analyzed to generate a risk report, a sustainability report, a landfill report, a raw material source report, etc.

20 Claims, 18 Drawing Sheets

(51) Int. Cl.
*G06Q 10/06* (2012.01)
*G06Q 10/10* (2012.01)
*G06F 16/25* (2019.01)
*H04L 29/08* (2006.01)
*G06F 3/0482* (2013.01)
*H04L 29/06* (2006.01)

(56) References Cited

U.S. PATENT DOCUMENTS

| | | | |
|---|---|---|---|
| 2008/0228305 A1* | 9/2008 | Wang | G06Q 10/06 700/109 |
| 2008/0293614 A1* | 11/2008 | Bishop | B01J 20/183 510/507 |
| 2009/0139907 A1* | 6/2009 | Hollingsworth | G06Q 10/00 209/2 |
| 2013/0346338 A1* | 12/2013 | Burns | G06Q 10/0833 705/333 |

* cited by examiner

WASTE MANAGEMENT SYSTEM

RELATED APPLICATIONS

This application claims priority to and is a non-provisional of U.S. Provisional Application 62/473,897, titled "Waste Management System" and filed on Mar. 20, 2017, which is incorporated herein by reference.

BACKGROUND

Many waste facilities, waste generators, research centers, government agencies, sustainability organizations, companies, etc. may attempt to determine parameters of waste generated and/or disposed of in an area (e.g., a city, a state, a country, etc.), determine effects of the waste on various aspects of the environment and/or determine sustainability performances in the area. However, waste information may be difficult to access and/or manage as a result of waste transactions being performed using different formats, inconsistent terminology and/or units of measurement, paper forms, different databases, etc.

SUMMARY

In accordance with the present disclosure, one or more computing devices, systems, and/or methods are provided. In an example, a plurality of waste information databases are accessed. Data comprised within the plurality of waste information databases may be analyzed to identify data records associated with waste. The data records may be extracted from the plurality of waste information databases. Each of the data records may be formatted, in accordance with a first format associated with a waste information aggregation database, to generate a formatted set of data. The formatted set of data may be stored in the waste information aggregation database. A graphical user interface may be controlled to display a waste exchange platform interface comprising one or more selectable inputs. A request for a list of selectable waste options may be received, via the waste exchange platform, from a device associated with a user of the waste exchange platform interface. The request may comprise one or more parameters received via the one or more selectable inputs. The waste information aggregation database may be analyzed to identify waste items based upon the parameters. The list of selectable waste options may be generated based upon the waste items. The list of selectable waste options may be transmitted to the device.

In an example, a first graphical user interface, of a first device associated with a first user of a waste data aggregation platform, may be controlled to display a profile interface of the waste data aggregation platform. A waste profile may be generated based upon one or more inputs received via the profile interface from the first device. The waste profile may comprise a plurality of parameters of waste. Responsive to receiving the waste profile, a second graphical user interface, of a second device associated with a second user of the waste data aggregation platform, may be controlled to display an approval interface of the waste data aggregation platform. The approval interface may display a representation the waste profile. An approval notice may be received, from the second device, via the approval interface. The approval notice may correspond to the waste profile. Responsive to receiving the approval notice, the first graphical user interface of the first device may be controlled to display a shipping documentation interface of the waste data aggregation platform. The shipping documentation interface may comprise a plurality of digital forms defining shipping parameters of shipment of the waste to a destination associated with the second user. Shipping information may be entered into the plurality of digital forms based upon at least one of the waste profile or one or more second inputs received from at least one of the first device or the second device via the shipping documentation interface. A shipping order for the shipment of the waste to the destination may be generated based upon the shipping information. Communications received in association with the shipping order may be monitored. A first event associated with the shipping order may be detected. The first event may be detected by receiving a first electronic message associated with the shipping order. Responsive to detecting the first event, a first electronic notification corresponding to the first event may be generated. The first electronic notification may be transmitted over a network communication to one or more devices associated with the shipment of the waste to the destination.

In an example, a graphical user interface of a device may be controlled to display a shipping documentation interface. The shipping documentation interface may comprise a plurality of digital forms defining shipping parameters of shipment of waste to a destination. Shipping information may be entered into the plurality of digital forms based upon at least one of information extracted from a waste information aggregation database or one or more inputs received from the device via the shipping documentation interface. A shipping order may be generated for the shipment of the waste to the destination based upon the shipping information. Communications received in association with the shipping order may be monitored. A first event associated with the shipping order may be detected. The first event may be detected by receiving a first electronic message associated with the shipping order. Responsive to detecting the first event, a first electronic notification corresponding to the first event may be generated. The first electronic notification may be transmitted over a network communication to one or more devices associated with the shipment of the waste to the destination.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

Figure 1:
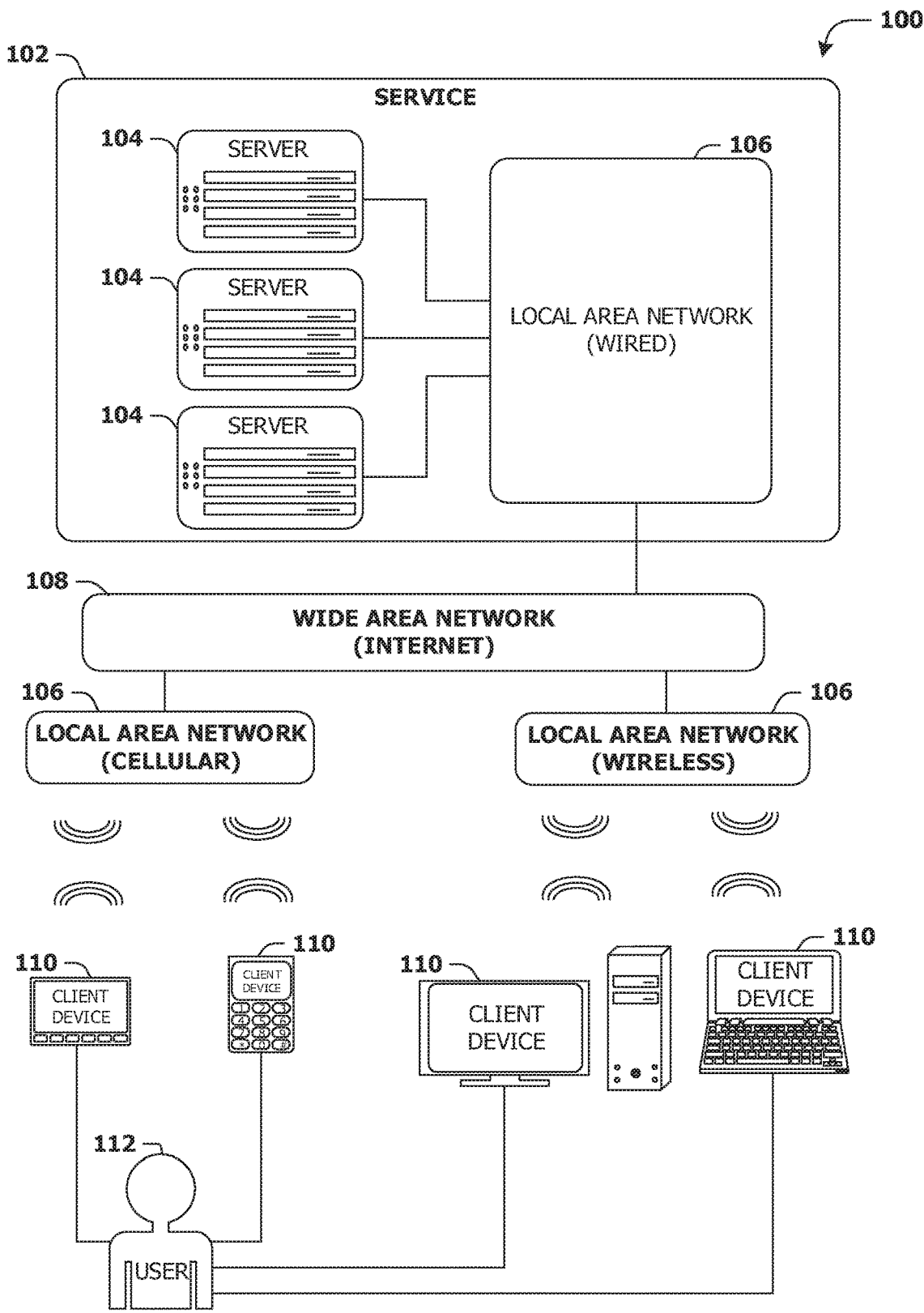
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

In the scenario 100 of FIG. 1, the service 102 may be accessed via a wide area network 108 (WAN) by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108.

One or more client devices 110 may comprise a cellular communicator and may communicate with the service 102 by connecting to the wide area network 108 via a wireless local area network 106 (LAN) provided by a cellular provider.

Alternatively and/or additionally, one or more client devices 110 may communicate with the service 102 by connecting to the wide area network 108 via a wireless local area network 106 provided by a location such as the user's home or workplace. The wireless local area network 106 may, for example, be a WiFi (Institute of Electrical and Electronics Engineers (IEEE) Standard 802.11) network or a Bluetooth (IEEE Standard 802.15.1) personal area network.

It may be appreciated that the servers 104 and the client devices 110 may communicate over various types of networks. Exemplary types of networks that may be accessed by the servers 104 and/or client devices 110 include mass storage, such as network attached storage (NAS), a storage area network (SAN), or other forms of computer or machine readable media.

The servers 104 of the service 102 may be interconnected directly, or through one or more other networking devices, such as routers, switches, and/or repeaters. The servers 104 may utilize a variety of physical networking protocols, such as Ethernet and/or Fiber Channel, and/or logical networking protocols, such as variants of an Internet Protocol (IP), a Transmission Control Protocol (TCP), and/or a User Datagram Protocol (UDP).

The servers 104 of the service 102 may be internally connected via a local area network 106. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

The local area network 106 may be a wired network where network adapters on the respective servers 104 are interconnected via cables (e.g., coaxial and/or fiber optic cabling), and may be connected in various topologies (e.g., buses, token rings, meshes, and/or trees). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art.

Alternatively and/or additionally, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

Figure 2:
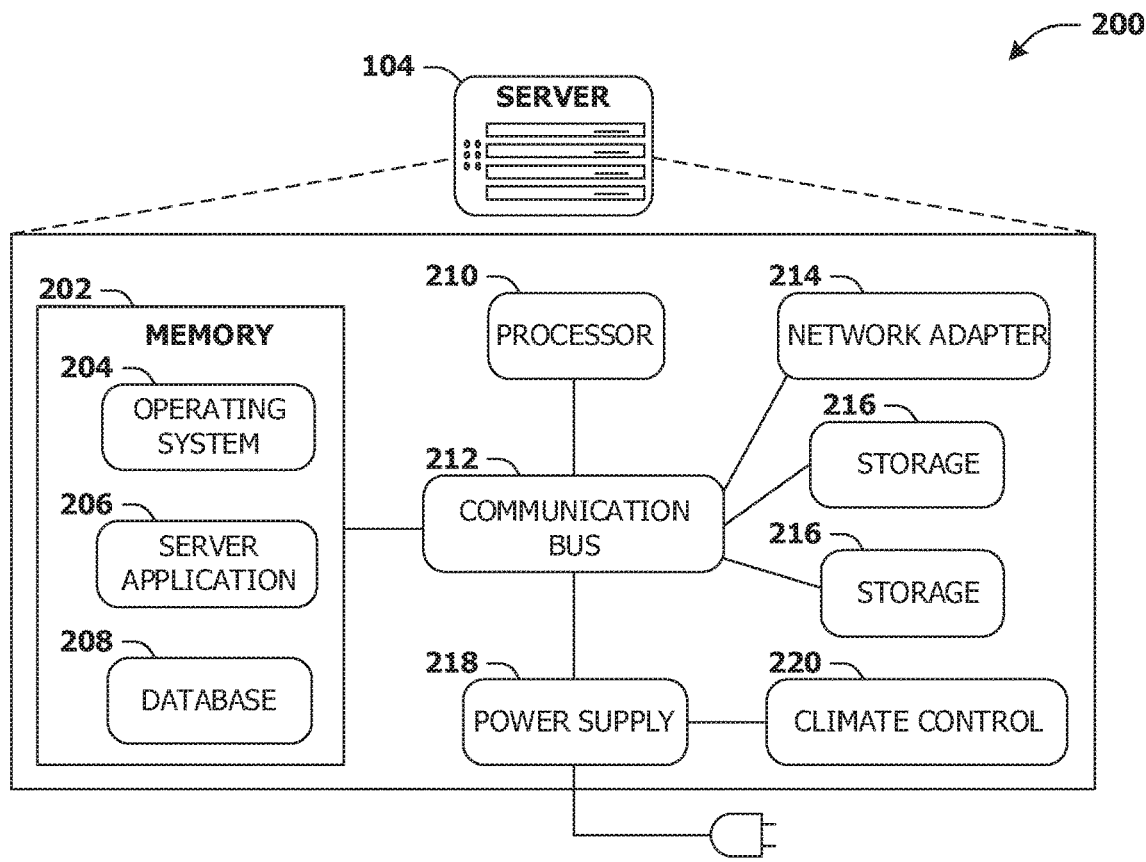
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise a variety of peripheral components, such as a wired and/or wireless network adapter 214 connectable to a local area network and/or wide area network; one or more storage components 216, such as a hard disk drive, a solid-state storage device (SSD), a flash memory device, and/or a magnetic and/or optical disk reader.

The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components.

The server 104 may provide power to and/or receive power from another server and/or other devices. The server 104 may comprise a dedicated and/or shared power supply 218 that supplies and/or regulates power for the other components. The server 104 may comprise a shared and/or dedicated climate control unit 220 that regulates climate properties, such as temperature, humidity, and/or airflow.

The server 104 may include one or more other components that are not shown in the schematic diagram 200 of FIG. 2, such as a display; a display adapter, such as a graphical processing unit (GPU); input peripherals, such as a keyboard and/or mouse; and a flash memory device that may store a basic input/output system (BIOS) routine that facilitates booting the server 104 to a state of readiness. A plurality of such servers 104 may be configured and/or adapted to utilize at least a portion of the techniques presented herein.

Figure 3:
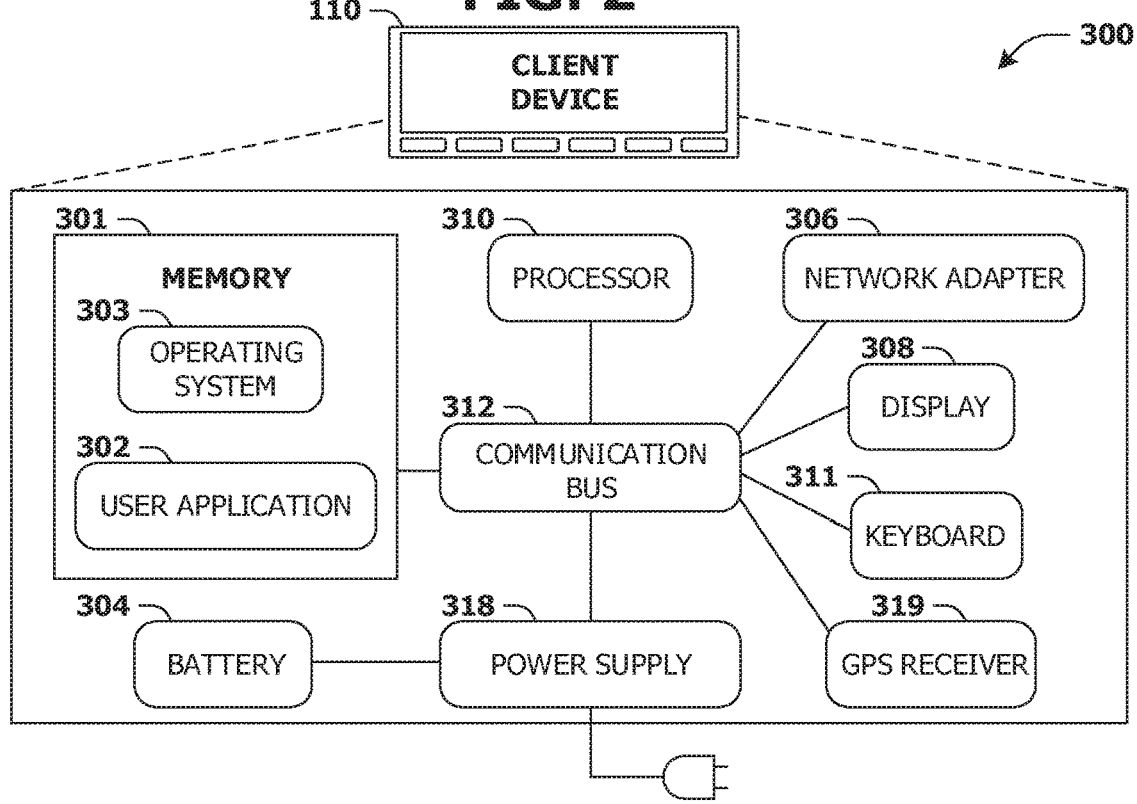
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112.

The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals.

In some examples, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified.

In such examples, descriptive content may be stored, typically along with contextual content. For example, the source of an email address (e.g., a communication received from another user via an instant messenger application) may be stored as contextual content associated with the email address. Contextual content, therefore, may identify circumstances surrounding receipt of an email address (e.g., the date or time that the email address was received), and may be associated with descriptive content. Contextual content, may, for example, be used to subsequently search for associated descriptive content. For example, a search for email addresses received from specific individuals, received via an instant messenger application or at a given date or time, may be initiated.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory.

The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

The client device 110 may comprise a variety of peripheral components, such as a wired and/or wireless network adapter 306 connectable to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol.

The client device 110 may include one or more other components that are not shown in the schematic architecture diagram 300 of FIG. 3, such as one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness. In some examples, the client device 110 may include a climate control unit that regulates climate properties, such as temperature, humidity, and airflow.

The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

The client device 110 may serve the user in a variety of roles, such as a workstation, kiosk, media player, gaming device, and/or appliance. The client device 110 may therefore be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence.

One or more computing devices, systems, and/or methods are provided for managing waste. In some examples, an entity (e.g., a waste facility, a waste generator, a company, etc.) may pursue various services and/or products associated with waste. For example, the entity may be a waste generator (e.g., a manufacturing plant, a factory, etc.) that generates waste. The waste generator may attempt to determine one or more waste facilities that can dispose of the waste. Alternatively and/or additionally, the entity may be a waste facility and/or a company attempting to efficiently access waste information corresponding to waste (e.g., previously) disposed of (e.g., by the waste facility and/or the company) and/or to acquire one or more raw materials that may be acquired and/or utilized from various types of waste.

However, waste information may be difficult to access and/or manage as a result of waste transactions being performed using different formats, inconsistent terminology and/or units of measurement, paper forms, different databases, etc. Accordingly, a waste information aggregation database may be maintained by a waste data aggregation platform and/or a waste exchange platform. The waste information aggregation database may be maintained and/or updated by extracting data records associated with waste, formatting each of the data records in accordance with the waste information aggregation database and/or storing a formatted set of data in the waste information aggregation database. Alternatively and/or additionally, waste transactions and/or shipments of waste may be facilitated by the waste data aggregation platform and/or the waste exchange platform. Accordingly, the waste information aggregation database may be (e.g., further) maintained and/or updated (e.g., in real time) by storing information associated with the waste transactions and/or the shipments of waste (e.g., waste profiles, shipping information, etc.) in the waste information aggregation database.

In some examples, the waste exchange platform may provide a multi-sided marketplace, such as a material marketplace, a waste marketplace, or a waste lead subscription marketplace. The multi-sided marketplace may be two-sided, for example, and may establish a connection between a first type of entity (e.g., a generator and/or provider of waste) accessing a first interface of the marketplace with a second type of entity (e.g., a receiver of waste) accessing a second interface of the marketplace. The multi-sided marketplace may allow for the management and/or tracking of waste onsite at a facility of a waste generator, as well as the management of vendors, documents and materials.

Parts of the waste information aggregation database may be analyzed to generate a plurality of reports. For example, a sustainability report may be generated comprising sustainability performance indicators of one or more waste generators and/or one or more waste facilities. A risk report may be generated comprising risk indicators of disposing a type of waste at one or more locations (e.g., a first effect of disposing of the type of waste on surface water of the one or more locations, a second effect of disposing of the type of waste on groundwater of the one or more locations, a third effect of disposing of the type of waste on air of the one or more locations, etc.). A landfill report may be generated comprising effects of disposing of the type of waste into a landfill (e.g., wherein the landfill report may comprise an air space utilization factor (AUF) report, a landfill temperature report, a landfill odor report and/or a landfill risk report that may provide a landfill audit that determines whether the waste stream of the generator is properly disposed at appropriate waste disposal site based upon such landfill's regulatory permit and/or other criteria). A raw material source report may be generated comprising indications of raw materials comprised within the type of waste and/or instructions for utilization of the one or more raw materials. In some examples, the plurality of reports may be used to identify possible improvements to a process for disposing of the type of waste and/or may provide insights on more sustainable practices for the type of waste. The plurality of reports may be presented and/or transmitted to waste facilities, waste generators, research centers, government agencies, sustainability organizations, companies, etc.

Figure 4A:
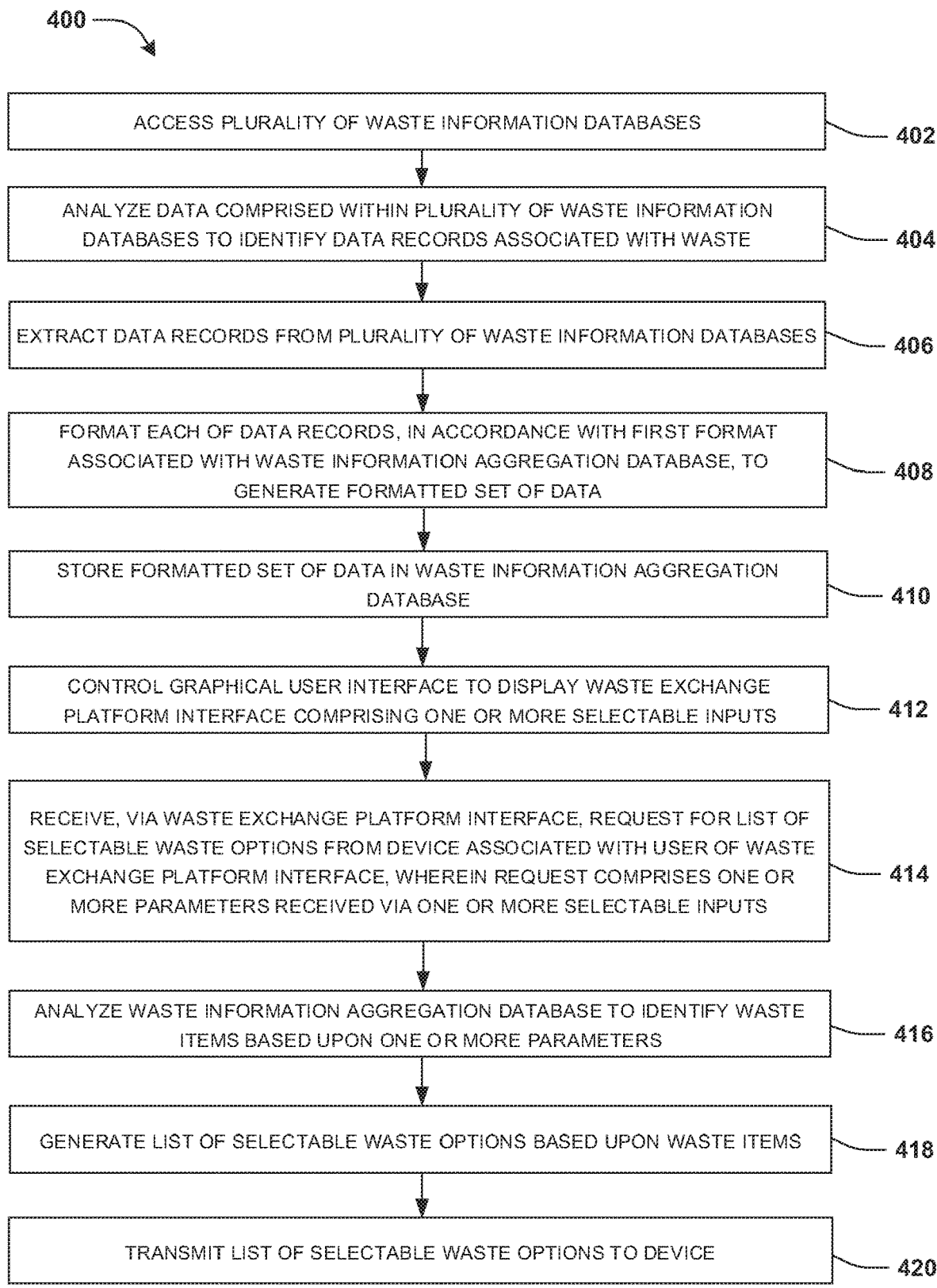
FIG. 4A is a flow chart illustrating an example method for managing waste.

An embodiment of managing waste is illustrated by an example method 400 of FIG. 4A. A first user, such as user Jill, (e.g., and/or a first device associated with the first user) may access and/or interact with a service, such as a website, an application, etc. that provides a waste exchange platform for viewing, browsing through, searching for, etc. waste options (e.g., waste facilities, waste vendors associated with waste products and/or waste services for disposal of waste, sources of raw materials, etc.).

In some examples, the waste exchange platform may generate, maintain and/or update a waste information aggregation database. Accordingly, at 402, a plurality of waste information databases may be accessed (e.g., by the waste exchange platform). In some examples, the waste exchange platform may generate, maintain and/or update leads for waste disposal and/or transportation opportunities, with such leads subscribed to by waste haulers for pursuit of the associated opportunities. In some examples, the plurality of waste information databases may comprise public databases and/or private (e.g., and/or payment based) databases. For example, the waste exchange platform may (e.g., autonomously) mine and/or access the plurality of waste information databases. In some examples, each of the plurality of waste information databases may be externally verified (e.g., by an independent third party). A plurality of networks and/or a plurality of domains may be mined and/or accessed (e.g., autonomously) by the waste exchange platform. In some examples, the plurality of networks may comprise public networks and/or private (e.g., and/or payment based) networks. In some examples, the plurality of domains may comprise public domains and/or private (e.g., and/or payment based) domains. The plurality of waste information databases, the plurality of networks and/or the plurality of domains may comprise waste information associated with waste, waste generators, waste facilities, waste services, sources of raw materials, etc.

At 404, data comprised within the plurality of waste information databases may be analyzed to identify data records associated with waste. At 406, the data records may be extracted from the plurality of waste information databases. At 408, each of the data records may be formatted, in accordance with a first format associated with the waste information aggregation database, to generate a formatted set of data. For example, the waste exchange platform may conduct a scrubbing process and/or a verification process on the data records. For example, elements of the data records that are determined to be incorrect, incomplete, improperly formatted, duplicated, etc. may be amended and/or removed. Alternatively and/or additionally, various units (e.g., of measurements) of the data records may be converted into standard units (e.g., of measurements) associated with the waste information aggregation database. At 410, the formatted set of data may be stored in the waste information aggregation database.

In some examples, the waste information aggregation database may be maintained and/or updated by periodically (e.g., once per hour, once per day, once per week, etc.) mining and/or accessing the plurality of waste information databases, the plurality of networks and/or the plurality of domains, analyzing data comprised within the plurality of waste information databases to identify data records associated with waste, extracting the data records, formatting each of the data records in accordance with the waste information aggregation database and/or storing a formatted set of data in the waste information aggregation database. Alternatively and/or additionally, the waste exchange platform may allow for waste disposal lead opportunities to be generated, identified, or otherwise found by subscribers to the platform. Alternatively and/or additionally, the waste exchange platform may (e.g., autonomously) search the internet and/or networks to find additional waste information databases (e.g., associated with waste), additional networks (e.g., associated with waste) and/or additional domains (e.g., associated with waste). Responsive to finding the additional waste information databases, the additional networks and/or the additional domains, the additional waste information databases may be added to the plurality of waste information databases, the additional networks may be added to the plurality of networks, and/or the additional domains may be added to the plurality of domains.

In some examples, the waste information aggregation database may comprise information for each waste facility of a plurality of waste facilities (e.g., that accept types of waste for storage, processing, treatment, disposal, destruction, recycling and/or reuse). For example, the waste information aggregation database may comprise a waste facility name, a physical address (e.g., which may be verified using United States Postal Service (USPS) verification tools for physical addresses in the United States and/or other verification tools for physical addresses in countries other than the United States), a phone number, a fax number, days/hours of operation, a waste facility type, waste facility services (e.g., types of waste that may be accepted), a list of analytical requirements for waste approval, contact information for a waste facility sales manager, contact information for a waste facility operations manager, contact information for a waste facility operations manager, contact information for a waste facility approvals manager, one or more types of storage provided, one or more types of processes conducted, one or more types of treatments conducted, one or more types of disposal conducted (e.g., landfill, demolition landfill, materials recovery, materials recovery and transfer, transfer station, rail transload facility, incinerator, waste-to-energy plant, composting, etc.), permit numbers, regulatory permit requirements, permitted waste types, a standard industrial classification (SIC) code, a North American industry classification system (NAICS) code, regulatory identification numbers, latitude and longitude coordinates, waste facility entry and/or exit routing requirements, etc. for each waste facility of a plurality of waste facilities.

Alternatively and/or additionally, the waste information aggregation database may comprise information for each waste vendor of a plurality of waste vendors (e.g., that conduct services related to waste). Alternatively and/or additionally, the waste information aggregation database may comprise information for each source of raw materials of a plurality of sources of raw materials (e.g., that may generate various types of waste comprising raw materials that may be used and/or utilized for various purposes).

At 412, a graphical user interface (e.g., of the first device) may be controlled to display a waste exchange platform interface (e.g., of the waste exchange platform) comprising one or more selectable inputs. In some examples, the waste exchange platform interface may provide for viewing, browsing through, searching for, etc. waste items. The waste items may comprise waste facilities that accept types of waste for storage, processing, treatment, disposal, destruction, recycling and/or reuse (e.g., of the types of waste). For example, the first user may be associated with a waste generator. The waste exchange platform interface may enable the first user to determine, view, browse through, search for, etc. facility information of the waste facilities that may accept waste generated by the waste generator.

Alternatively and/or additionally, the waste items may comprise waste vendors that conduct services related to the waste and/or provide waste products for managing the waste. The services of the waste vendors may comprise waste disposal (e.g., landfill) services, waste recycling services, waste brokering services, industrial cleaning services, environmental clean-up, remediation, construction services, (e.g., environmental) emergency response services, transportation services of waste, waste container vendors, environmental sampling, environmental consulting services (e.g., waste-related assessments, characterizations, evaluations, etc.) (e.g., environmental) laboratory testing and/or analysis services. For example, the first user may be associated with the waste generator and/or a waste facility. The waste exchange platform interface may enable the first user to determine, view, browse through, search for, etc. vendor information of the waste vendors that may conduct services related to the waste and/or provide products for managing the waste.

Alternatively and/or additionally, the waste items may comprise sources of raw materials. For example, the sources of raw materials may comprise companies, facilities, manufacturers, plants, storage facilities, etc. that may own raw materials that may be used and/or utilized for various purposes. Alternatively and/or additionally, the sources of raw materials may generate waste comprising utilizable raw materials. For example, the first user may be associated with a company, a facility, a manufacturer, a plant, etc. that may use a plurality of raw materials to perform operations, manufacture goods and/or perform services. The waste exchange platform interface may enable the first user to determine, view, browse through, search for, etc. raw material source information of one or more sources of raw materials that may comprise (e.g., waste comprising) one or more raw materials of the plurality of raw materials (e.g., beneficial reuse). Alternatively and/or additionally, the waste exchange platform interface may provide instructions for utilizing the one or more raw materials. Alternatively and/or additionally, the waste exchange platform interface may provide one or more second sources of raw materials that may comprise (e.g., waste comprising) one or more second raw materials that may be used instead of one or more third raw materials of the plurality of raw materials for manufacturing the goods and/or performing the services.

In some examples, the waste exchange platform interface may comprise a first selectable input corresponding to (e.g., searching for) waste facilities. Alternatively and/or additionally, the waste exchange platform interface may comprise a second selectable input corresponding to (e.g., searching for) waste vendors. Alternatively and/or additionally, the waste exchange platform interface may comprise a third selectable input corresponding to (e.g., searching for) sources of raw materials.

In some examples, responsive to a selection of the first selectable input (e.g., corresponding to waste facilities), one or more second selectable inputs may be displayed (e.g., by the waste exchange platform interface). First search criteria may be inputted (e.g., by the first user and/or the first device) using the one or more second selectable inputs. The first search criteria may comprise one or more first parameters identifying one or more types of waste (e.g., and/or a composition of materials) corresponding to the waste that the first user may want to undergo storage, processing, treatment, disposal, destruction, recycling and/or reuse. Alternatively and/or additionally, the first search criteria may comprise a geographic location (e.g., and/or a geographic area) of the waste, waste by-products associated with the waste, a preferred distance (e.g., of a waste facility) from the geographic location of the waste, one or more waste facilities and/or desired actions and/or processes for managing the waste (e.g., storage, processing, treatment, disposal, destruction, recycling and/or reuse).

Alternatively and/or additionally, first filters (e.g., to be applied when performing a search for waste facilities) may be inputted (e.g., by the first user and/or the first device) using the one or more second selectable inputs. For example, the first filters may comprise one or more types of waste facilities, one or more facility processes for managing the waste, preferred waste facilities, approved waste facilities, waste facility sustainability ratings, waste facility compliance history, waste facility community ratings, waste facility requirements for analytical and/or other material evaluations, common requirements for analytical and/or other material evaluations by waste facilities, contract requirements of waste facilities, insurance coverage of waste facilities, etc.

In some examples, responsive to a selection of the second selectable input (e.g., corresponding to waste vendors), one or more third selectable inputs may be displayed (e.g., by the waste exchange platform interface). Second search criteria may be inputted (e.g., by the first user and/or the first device) using the one or more third selectable inputs. The second search criteria may comprise one or more second parameters identifying one or more services that the first user may want conducted on the waste and/or one or more waste products. Alternatively and/or additionally, the second search criteria may comprise a geographic location (e.g., and/or a geographic area) of the waste, a preferred distance (e.g., of a waste vendor) from the geographic location of the waste, one or more waste vendors, etc.

Alternatively and/or additionally, second filters (e.g., to be applied when performing a search for waste vendors) may be inputted (e.g., by the first user and/or the first device) using the one or more third selectable inputs. For example, the second filters may comprise one or more types of waste vendors, one or more waste products provided by waste vendors, one or more vendor processes and/or vendor equipment for managing the waste, preferred waste vendors, approved waste vendors, waste vendor sustainability ratings, waste vendor compliance history, waste vendor community ratings, waste vendor referrals, contract requirements of waste vendors, insurance coverage of waste vendors, etc.

In some examples, responsive to a selection of the third selectable input (e.g., corresponding to sources of raw materials), one or more fourth selectable inputs may be displayed (e.g., by the waste exchange platform interface). Third search criteria may be inputted (e.g., by the first user and/or the first device) using the one or more fourth selectable inputs. The third search criteria may comprise one or more third parameters identifying one or more types of raw materials. Alternatively and/or additionally, the third search criteria may comprise a geographic location (e.g., and/or a geographic area) of the first user (e.g., and/or the company, the facility, the manufacturer, the plant, etc.), a preferred distance (e.g., of a source of raw materials) from the geographic location of the first user, an ownership associated with a source of raw materials, etc.

Alternatively and/or additionally, third filters (e.g., to be applied when performing a search for sources of raw materials) may be inputted (e.g., by the first user and/or the first device) using the one or more fourth selectable inputs. For example, the third filters may comprise one or more subtypes of raw materials, one or more types of ownership associated with sources of raw materials, condition (e.g., quality, state) of raw materials, volume of raw materials, community ratings, source of raw material referrals, contract requirements of sources of raw materials, etc.

Accordingly, at 414, a request for a list of selectable waste options may be received from the first device via the waste exchange platform interface. The request may comprise one or more parameters received via the one or more selectable inputs. For example, the one or more parameters may comprise the one or more first parameters (e.g., identifying the one or more types of waste), the one or more second parameters (e.g., identifying the one or more services and/or products) or the one or more third parameters (e.g., identifying the one or more types of raw materials). Alternatively and/or additionally the request may comprise filters received via the one or more selectable inputs. For example, the filters may comprise the first filters (e.g., for searching for waste facilities), the second filters (e.g., for searching for waste vendors) or the third filters (e.g., for searching for sources of raw materials).

At 416, the waste information aggregation database may be analyzed to identify waste items based upon the one or more parameters. Alternatively and/or additionally, the waste information aggregation database may be analyzed to identify the waste items based upon the filters. For example, the one or more parameters and/or the filters may be compared with information corresponding to each waste item of a plurality of waste items comprised within the waste information aggregation database. In some examples, responsive to determining that the one or more parameters and/or the filters match (e.g., and/or have a similarity exceeding a threshold with) a database entry, a waste item corresponding to the database entry may be selected for addition to the list of selectable waste options. In some examples, the waste information aggregation database may be organized and/or categorized wherein each waste item of the plurality of waste items may be linked with one or more identifiers (e.g., to facilitate the analyzing the waste information aggregation database and/or comparing the one or more parameters and/or the filters with information corresponding to each waste item of the plurality of waste items). For example, each waste item of the plurality of waste items may be linked with identifiers corresponding to geographic location, types of waste, etc. Alternatively and/or additionally, the waste information aggregation database may be indexed and/or summarized to provide for expedited searching of the waste information aggregation database.

In some examples, (e.g., merely) a portion of the waste information aggregation database may be analyzed to identify the waste items based upon the one or more parameters and/or the filters. For example, a first portion of the waste information aggregation database associated with waste facilities may be analyzed responsive to determining that the request for the list of selectable waste options is associated with waste facilities. Alternatively and/or additionally, a second portion of the waste information aggregation database associated with waste vendors may be analyzed responsive to determining that the request for the list of selectable waste options is associated with waste vendors. Alternatively and/or additionally, a third portion of the waste information aggregation database associated with sources of raw materials may be analyzed responsive to determining that the request for the list of selectable waste options is associated with sources of raw materials.

In some examples, multiple (e.g., waste information) databases may be analyzed to identify the waste items based upon the one or more parameters and/or the filters. For example, at least a portion of the plurality of waste information database may be analyzed to identify the waste items based upon the one or more parameters and/or the filters. In some examples, an amount of time, a number of databases analyzed and/or a proportion (e.g., an entirety, a portion, etc.) of the waste information aggregation database analyzed for identifying the waste items may be set and/or adjusted automatically and/or manually by an administrator (e.g., of the waste exchange platform interface) and/or by the first user.

At 418, the list of selectable waste options may be generated based upon the waste items. In some examples, each selectable waste option of the list of selectable waste options may comprise one or more characteristics of a corresponding waste item. In a first example, each selectable waste option of the list of selectable waste options may correspond to a waste facility. Accordingly, each selectable waste option of the list of selectable waste options may comprise a name of a company, a location, a rating of the company, financial requirements (e.g., cost, payment schedule, etc.), parameters for disposal of waste and/or one or more waste types accepted for processing, treatment, disposal, destruction, recycling and/or reuse. In a second example, each selectable waste option of the list of selectable waste options may correspond to a waste vendor. Accordingly, each selectable waste option of the list of selectable waste options may comprise a name of a company, a location, a rating of the company, financial requirements and/or parameters for conducting services associated with waste. In a third example, each selectable waste option of the list of selectable waste options may correspond to a source of raw materials. Accordingly, each selectable waste option of the list of selectable waste options may comprise a name of a company, a location, a rating of the company, financial requirements and/or one or more raw materials owned by the company.

In some examples, the system may identify and provide, as part of the list of selectable waste options, possible waste disposal sites selected based on criteria. The criteria used to identify and/or rank the possible waste disposal sites may include the quantity of waste associated with the request, the type of waste stream associated with the request, the location of the respective waste disposal site, the respective regulatory permit(s) of the waste disposal site, the permit(s) associated with the request, the capacity of the waste disposal site, the temporal volume of the waste permitted at the waste disposal site (i.e., near real-time space availability at the waste disposal site), and/or other factors. The system may triangulate such factors to determine/select an optimal (e.g., highest ranked) location to send the waste. The factors considered may include the freshness of an audit of each waste disposal site for the waste stream to be disposed of at an authorized vendor (i.e., real-time audit of the waste disposal sites to determine whether the waste stream is able to be disposed at each waste disposal site).

At 420, the list of selectable waste options may be transmitted to the first device (e.g., associated with the first user). For example, the graphical user interface of the first device may be controlled to display the waste exchange platform interface comprising the list of selectable waste options. In some examples, a selection of a first selectable waste option of the list of selectable waste options may be received via the waste exchange platform interface. Responsive to receiving the selection of the first selectable waste option, the graphical user interface of the first device may be controlled to display the waste exchange platform interface comprising detailed characteristics of a waste item corresponding to the first selectable waste option. Alternatively and/or additionally, the waste exchange platform interface may comprise a fifth selectable input corresponding to the waste item.

In a first example, the first selectable waste option may correspond to a first waste facility. Accordingly, the detailed characteristics may comprise a name of a company associated with the first waste facility, a location of the first waste facility, a rating of the company, financial requirements, parameters for disposal of waste, one or more waste types accepted for processing, treatment, disposal, destruction, recycling and/or reuse, requirements for transporting the waste to the waste facility, etc. In a second example, the first selectable waste option may correspond to a first waste vendor. Accordingly, the detailed characteristics may comprise a name of a company associated with the first waste vendor, a location of the first waste vendor, a rating of the company, financial requirements, parameters for conducting services associated with waste, one or more waste types accepted for conducting services, requirements for transporting the waste to the waste vendor, etc. In a third example, the first selectable waste option may correspond to a first source of raw materials. Accordingly, the detailed characteristics may comprise a name of a company associated with the first source of raw materials, a location of the first source of raw materials, a rating of the company, financial requirements, one or more raw materials owned by the company, requirements for transporting of the raw materials from the source of raw materials, etc.

In some examples, a selection of the fifth selectable input (e.g., corresponding to the waste item of the first selectable waste option) may be received via the waste exchange platform interface. Responsive to receiving the selection of the fifth selectable input, an electronic waste transfer message may be generated based upon the first selectable waste option, the waste item and/or the one or more parameters (e.g., of the request for the list of selectable waste options). The electronic waste transfer message may comprise a request for service directed to the first waste facility, the first waste vendor or the first source of raw materials (e.g., corresponding to the first selectable option). The electronic waste transfer message may be transmitted over a network communication to a second device associated with a second user of the waste exchange platform interface. The second user may be associated with (e.g., and/or identified by) the first selectable waste option. For example, the second user may be an employee, a manager, etc. of the first waste facility, the first waste vendor or the first source of raw materials. Alternatively and/or additionally, the second user may be associated with an account of the waste exchange platform held by the first waste facility, the first waste vendor or the first source of raw materials.

In some examples, a second graphical user interface of the second device (e.g., associated with the second user) may be controlled to display the waste exchange platform interface comprising the electronic waste transfer message. In some examples, a selection of a sixth selectable input corresponding to a transaction request (e.g., associated with the electronic waste transfer message) may be received via the waste exchange platform interface from the second device. For example, the electronic waste transfer message may be reviewed by the second user. The sixth selectable input corresponding to the transaction request may be selected by the second user (e.g., and/or the second device) based upon the electronic waste transfer message.

In some examples, responsive to receiving the selection of the sixth selectable input (e.g., corresponding to the transaction request), an electronic transaction message comprising transaction information (e.g., cost, payment schedule, services provided, etc.) associated with the first selectable waste option may be generated. Alternatively and/or additionally, the electronic transaction message may be (e.g., automatically) generated (e.g., by the second device, by the waste exchange platform, by one or more servers connected to the second device via a network, etc.) based upon the electronic waste transfer message. The electronic transaction message may be transmitted over a network communication to the first device. Accordingly, a transaction may be facilitated between the first user and the second user.

In some examples, the first user (e.g., and/or the first device) may (e.g., later) access the waste exchange platform interface and/or provide a rating and/or a review (e.g., associated with an experience of the first user with one or more services) corresponding to the first selectable waste option (e.g., the first waste facility, the first waste vendor or the first source of raw materials). Alternatively and/or additionally, responsive to receiving the rating and/or the review, a notification may (e.g., automatically) be transmitted to the second device. In some examples, the second user (e.g., and/or the second device) may access the waste exchange platform interface and/or provide one or more replies to the rating and/or the review. Other users may view the rating and/or the review via the waste exchange platform interface.

In some examples, information associated with the request for the list of selectable waste options (e.g., the one or more parameters and/or the filters), the selection of the first selectable waste option, the selection of the fifth selectable input, the electronic waste transfer message, the transaction request and/or the electronic transaction message may be stored (e.g., in real time) in the waste information aggregation database. For example, responsive to determining that the first user has accessed the waste exchange platform interface, the waste information aggregation database may be maintained and/or updated by storing data associated with activity of the first user (e.g., and/or a plurality of users of the waste exchange platform interface) that may represent and/or indicate user information of the first user, waste generation capabilities associated with the first user, waste storage and/or disposal requirements associated with the first user, waste service requirements associated with the first user, raw material requirements associated with the first user, etc.

Alternatively and/or additionally, the waste information aggregation database may be maintained and/or updated by storing data associated with the plurality of users, such as common (e.g., search) terms used (e.g., for requests for lists of selectable waste options), number of views for each waste item (e.g., waste facility, waste vendor, source of raw materials) of the plurality of waste items of the waste exchange platform interface, conversion rates for each waste item of the plurality of waste items, contact information associated with the plurality of users and/or the plurality of waste items, favorites, location, ratings, comparative analytics, search rankings by materials, locations, demographics, types of businesses associated with the plurality of users, business sizes associated with the plurality of users and/or other data and/or parameters associated with activity of the plurality of users and/or the waste exchange platform interface. Accordingly, the data associated with (e.g., activity) of the plurality of users may be aggregated in the waste information aggregation database.

Parts of the waste information aggregation database may be analyzed to generate a plurality of reports. For example, a sustainability report may be generated comprising sustainability performance indicators of one or more waste generators, one or more waste facilities, one or more waste vendors and/or one or more sources of raw materials. A risk report may be generated comprising risk indicators of disposing a type of waste at one or more locations (e.g., a first effect on surface water by disposing the type of waste at the one or more locations, a second effect on groundwater by disposing the type of waste at one or more locations, a third effect on air by disposing the type of waste at the one or more locations, etc.). A landfill audit may be conducted of waste vendors to determine if the waste stream is being disposed of at, and accepted by, the appropriate landfill based on the landfill's respective regulatory permit requirements. A landfill report may be generated comprising effects of disposing of the type of waste into a landfill (e.g., wherein the landfill report may comprise an AUF report, a landfill temperature report, a landfill odor report and/or a landfill risk report). A raw material source report may be generated comprising indications of raw materials comprised within the type of waste and/or instructions for utilization of the one or more raw materials. In some examples, the plurality of reports may be used to improve a process for disposing of the type of waste and/or may provide insights on more sustainable practices for the type of waste. The plurality of reports may be presented and/or transmitted to waste facilities, waste generators, research centers, government agencies, sustainability organizations, companies, etc.

Figure 4B:
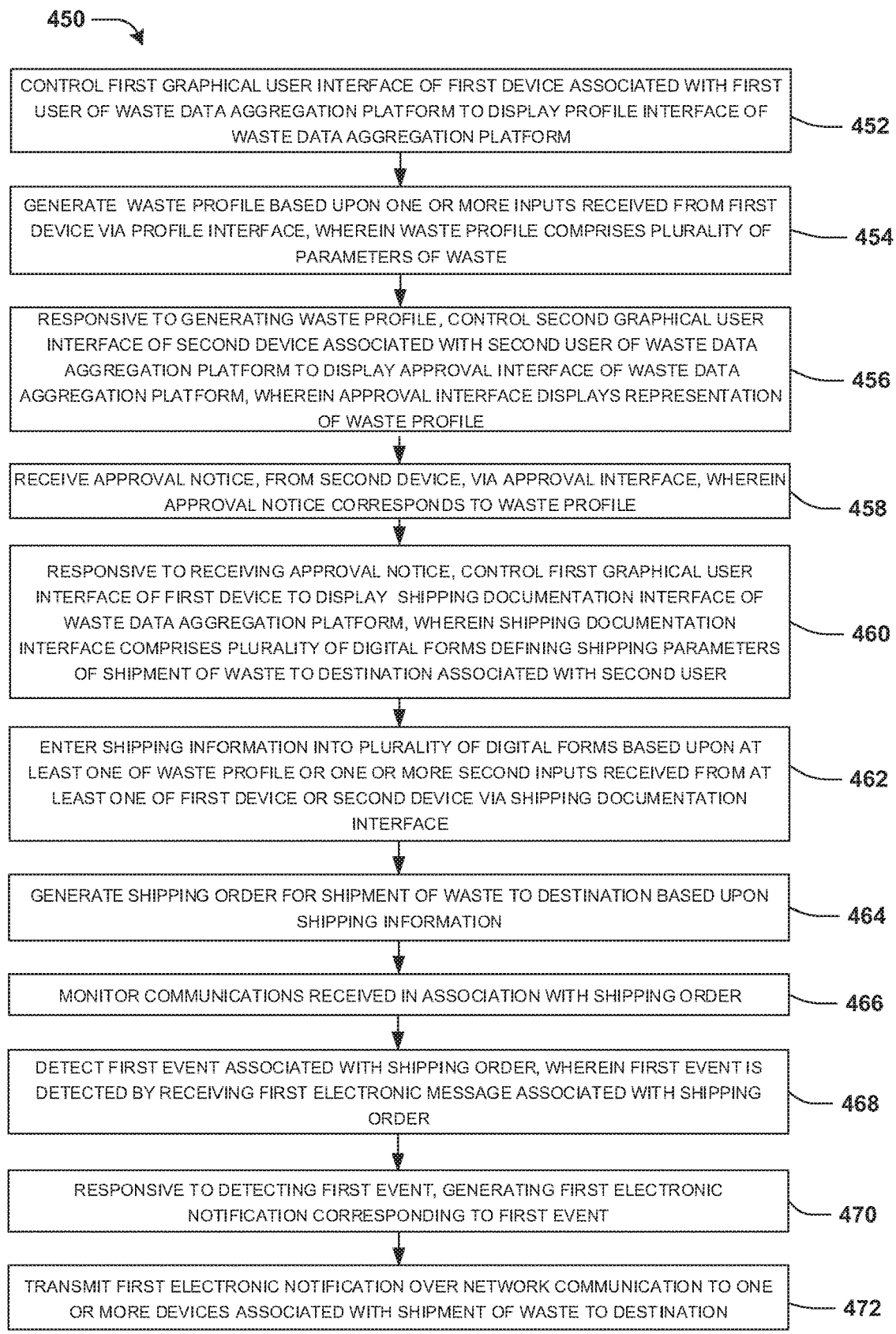
FIG. 4B is a flow chart illustrating an example method for managing waste.

An embodiment of managing waste is illustrated by an example method 450 of FIG. 4B. A first user, such as user James, (e.g., and/or a first device associated with the first user) may access and/or interact with a service, such as a website, an application, etc. that provides a waste data aggregation platform for managing waste.

In some examples, the first user may be associated with a waste generator (e.g., a manufacturing plant, a factory, etc.) that generates waste. The first user may attempt to perform a transaction with a waste facility for storing, processing, treating, disposing of, destructing, recycling and/or reusing the waste (e.g., generated by the waste generator). In some examples, a second user (e.g., associated with a second device) may be associated with the waste facility. The second user (e.g., and/or the waste facility) may hold an account within the waste data aggregation platform. The first user (e.g., and/or the waste generator) may be a customer or a potential customer of the second user (e.g., and/or the waste facility). The second user may create a second account for the first user (e.g., and/or for the waste generator) and may invite the first user to the second account to submit one or more waste profiles. For example, the second user may provide a link and/or account information associated with the second account to the first user. In some examples, account information may be received (e.g., via the first device and/or via the waste data aggregation platform) associated with the first user, the waste generator, one or more types of waste of the waste generated by the waste generator, etc. The second account may be configured and/or adjusted based upon the account information.

Accordingly, at 452, a first graphical user interface of the first device may be controlled to display a profile interface of the waste data aggregation platform. In some examples, the profile interface may comprise a digital waste profile form. In some examples, the digital waste profile form may be a universal digital waste profile form. The universal digital waste profile form may be a standard version of the digital waste profile form that may be used for facilitating (e.g., other) transactions associated with (e.g., other) users. Alternatively and/or additionally, the digital waste profile form may be a custom digital waste profile form. The custom digital waste profile form may be formatted by the second user (e.g., and/or the waste facility) and/or by a regulatory agency (e.g., and/or by a different entity based upon instructions and/or regulations of the regulatory agency). Alternatively and/or additionally, the custom digital waste profile form may be formatted specifically for customers and/or potential customers of the second user (e.g., and/or the waste facility).

At 454, a waste profile may be generated based upon one or more inputs received from the first device via the profile interface. The waste profile may comprise a plurality of parameters of the waste (e.g., generated by the waste generator). For example, the one or more inputs may be entered into the digital waste profile form by the first user (e.g., and/or the first device). Alternatively and/or additionally, the waste profile may be generated based upon one or more second inputs received from the second device via the profile interface. For example, the first user and/or the second user may have permissions to access (e.g., and/or authorization to access) the profile interface to input information into the digital waste profile form and/or to amend information inputted into the digital waste profile form. In some examples, the plurality of parameters of the waste may comprise a physical state of the waste, a process of generating the waste, a volume of the waste, a general composition of the waste, etc.

Alternatively and/or additionally, the profile interface may provide for uploading one or more documents (e.g., analytical reports, material safety data sheets (MSDS), etc.) associated with the waste and/or the waste profile. Alternatively and/or additionally, the profile interface may provide (e.g., a form library) for uploading regulatory forms and/or entering regulatory information associated with the waste into the regulatory forms. Alternatively and/or additionally, the profile interface may provide for inputting questions and/or comments (e.g., that the first user and/or the second user may have regarding the waste profile, the waste, etc.) into a notes section that may later be viewed using (e.g., the notes section of) the profile interface. In some examples, the profile interface may provide for electronic certification by the first user upon completion of the waste profile. For example, the first user may (e.g., electronically) sign the waste profile.

In some examples, the profile interface may provide for assisting the first user (e.g., and/or the first device) and/or the second user (e.g., and/or the second device) to complete the digital waste profile form (e.g., and/or other forms/documents such as regulatory forms, shipping documents, etc.). For example, an alternate form may be displayed by the profile interface. The alternate form may provide for the first user and/or the second user to input information corresponding to an initial location of the waste, a location of the waste facility, a physical state of the waste, a process of generating the waste, a volume of the waste, a general composition of the waste, etc. Accordingly, the information may be used to (e.g., automatically) generate the waste profile and/or to (e.g., automatically) enter the information into the digital waste profile form. Alternatively and/or additionally, using an expedited process of the profile interface, at least a portion of the digital waste profile form (e.g., and/or other forms) may be completed based upon the account information (e.g., of the first user) and/or second account information (e.g., of the waste facility) (e.g., comprising one or more accepted types of waste by the waste facility, one or more volumes of the one or more accepted types of waste accepted by the waste facility, regulatory permits obtained by the waste facility, etc.).

In some examples, the waste profile may be exported into one or more formats for viewing and/or processing using (e.g., external) programs and/or applications. Alternatively and/or additionally, the waste profile may be integrated into (e.g., other) programs and/or applications. Alternatively and/or additionally, the waste profile may be duplicated (e.g., cloned, replicated) to generate one or more duplicated waste profiles. The one or more duplicated waste profiles may be assigned one or more unique waste profile identification numbers. In some examples, the one or more duplicated waste profiles may be utilized by the first user, the second user and/or one or more other users of the profile interface and/or the waste data aggregation platform.

At 456, responsive to generating the waste profile (e.g., and/or responsive to receiving the electronic certification of the waste profile), a second graphical user interface of the second device (e.g., associated with the second user and/or the waste facility) may be controlled to display an approval interface of the waste data aggregation platform. The approval interface may display a representation of the waste profile. For example, a list of waste profiles may be displayed by the approval interface. In some examples, waste profiles comprised within the list of waste profiles may be modified by the second user (e.g., and/or the second device) by applying one or more filters based upon properties of a plurality of waste profiles associated with the second user. For example, the properties may include a length of time (e.g., 15 days, 30 days, 60 days, etc.) until expiration of waste profiles, expired waste profiles, approved waste profiles, unapproved waste profiles, waste profiles with pending approvals and/or renewals, rejected waste profiles, archived waste profiles, etc. Alternatively and/or additionally, an order (e.g., organization) of the list of waste profiles may be configured based upon fields (e.g., corresponding to columns of the list of waste profiles). For example, the fields may comprise approval number, profile name, common name of waste, generator, facility, transporter, bill to, creation date, modified date, expiration date, approved date, and/or status. In some examples, the approval interface may provide for viewing, browsing through, searching for waste profiles of the list of waste profiles. Alternatively and/or additionally, the list of waste profiles and/or one or more portions of the list of waste profiles may be exported into one or more formats for viewing and/or processing using (e.g., external) programs and/or applications.

In some examples, the approval interface may provide for the second user (e.g., and/or the second device) to input one or more comments and/or questions, corresponding to the waste profile, via the approval interface. Responsive to receiving the one or more comments and/or questions from the second device, the one or more comments and/or questions may be transmitted to the first device. The approval interface and/or a different interface of the waste data aggregation platform may provide for the first user to view the one or more comments and/or questions. The approval interface and/or the different interface may provide for the first user (e.g., and/or the first device) to input one or more responses (e.g., associated with the one or more comments and/or questions). Responsive to receiving the one or more responses from the first device, the one or more responses may be transmitted to the second device.

Alternatively and/or additionally, the approval interface may provide for the second user (e.g., and/or the second device) to input an expiration date of an approval notice corresponding to the waste profile, an approved volume of the waste and/or conditions for the waste. At 458, the approval notice may be received via the approval interface from the second device. The approval notice may correspond to the waste profile. In some examples, the approval notice may comprise the expiration date, the approved volume and/or the conditions. In some examples, responsive to receiving the approval notice from the second device, the approval notice may be transmitted to the first device.

In some examples, expiration notifications may be transmitted to the first device and/or the second device. For example, responsive to reaching a first length of time (e.g., 30 days, 20 days, 10 days, etc.) before the expiration date of the approval notice, a first expiration notification may be transmitted to the first device and/or the second device. Alternatively and/or additionally, responsive to reaching a second length of time (e.g., 15 days, 10 days, 5 days, etc.) before the expiration date of the approval notice, a second expiration notification may be transmitted to the first device and/or the second device.

In some examples, the approval notice may be exported into one or more formats for viewing and/or processing using (e.g., external) programs and/or applications. Alternatively and/or additionally, the approval notice may be integrated into (e.g., other) programs and/or applications. Alternatively and/or additionally, the approval notice may be duplicated (e.g., cloned, replicated) to generate one or more duplicated approval notices. The one or more duplicated approval notices may be assigned one or more unique approval notice identification numbers. In some examples, the one or more duplicated approval notices may be utilized by the second user and/or one or more other users of the approval interface and/or the waste data aggregation platform.

At 460, responsive to receiving the approval notice, the first graphical user interface of the first device may be controlled to display a shipping documentation interface of the waste data aggregation platform. The shipping documentation interface may comprise a plurality of digital forms defining shipping parameters of shipment of the waste to a destination associated with the second user (e.g., and/or the location of the waste facility). The plurality of digital forms may comprise a digital hazardous waste manifest, a digital non-hazardous waste manifest, a digital bill of lading, digital packing sheets, digital pre-shipment lists, digital continuation sheets or digital container labels. In some examples, shipping documentation requirements vary based upon local regulations, state regulations, federal regulations, country regulations, a type of the waste, mode of transportation and/or mode or form of final disposition of the waste.

In some examples, the shipping documentation interface may operate in conjunction with the federal United States Environmental Protection Agency (US EPA) and/or other regulatory agencies. For example, the shipping documentation interface may work in conjunction with the Hazardous Waste Electronic Manifest (E-Manifest) System associated with the US EPA. Alternatively and/or additionally, the shipping documentation interface may operate independently. Accordingly, the shipping documentation interface and/or the waste data aggregation platform may electronically track and/or document the waste from the initial location of the waste to the destination (e.g., the location of the waste facility) and/or through one or more processes of storing, treating, disposing, recycling, reusing, composting, etc. the waste. Accordingly, the shipping documentation interface and/or the waste data aggregation platform may determine regulatory compliances of the first user, the second user and/or other users of the waste data aggregation platform for the transportation and/or processing of various types of waste.

At 462, shipping information may be entered into the plurality of digital forms based upon the waste profile and/or one or more third inputs received from the first device and/or the second device (e.g., and/or a third device associated with a third user associated with a transporter of the waste) via the shipping documentation interface. For example, information comprised within the waste profile, and/or within other documents received and/or transmitted using the profile interface, may be formatted, in accordance with one or more formats associated with the plurality of digital forms, to generate formatted sets of data. The formatted sets of data may be (e.g., automatically) entered into the plurality of digital forms. Remaining shipping information may be entered into (e.g., incomplete) portions of the plurality of digital forms (e.g., manually) by the first user (e.g., and/or the first device), the second user (e.g., and/or the second device) and/or the third user (e.g., and/or the third device). The remaining shipping information may comprise a number of containers for shipment and/or a volume of the waste (e.g., for shipment). Alternatively and/or additionally, the plurality of digital forms may be completed (e.g., and/or filled) based upon the one or more third inputs received from the first device, the second device and/or the third device.

In some examples, transporter information associated with the transporter, such as a name of a driver, a driver's license number of the driver, a license plate number of a transporting vehicle, a transportation permit number, a vehicle (e.g., truck) number, etc., may be inputted via the shipping documentation interface and/or may be entered into the plurality of digital forms. In some examples, the transporter information may be evaluated against a plurality of databases. For example, the transporter information may be evaluated against one or more department of motor vehicles (DMV) databases to verify that a driver's license number of the driver is proper for transporting the waste. Alternatively and/or additionally, the transporter information may be evaluated against one or more department of transportation (DOT) databases to verify that the transporting vehicle has proper permits for transporting the waste. Alternatively and/or additionally, the transporter information may be evaluated against one or more department of homeland security databases to verify that the driver is not on a terrorist list.

At 464, a shipping order for the shipment of the waste to the destination may be generated based upon the shipping information. In some examples, the shipping order may be transmitted to the first device, the second device and/or the third device. Alternatively and/or additionally, a package of information may be transmitted to the third device. The package of information may comprise a route sheet corresponding to the shipment of the waste to the destination, an emergency response guidebook reference, the waste profile and/or the plurality of digital forms.

In some examples, communications received in association with the shipping order may be monitored, at 466. For example, a tracking device and/or one or more sensors may be positioned in a container, on a truck and/or in the waste. The tracking device may periodically transmit a location of the waste during a transportation process of the waste. The one or more sensors may periodically transmit conditions of the waste during the transportation process of the waste.

At 468, a first event associated with the shipping order may be detected (e.g., during the monitoring). The first event may be detected by receiving a first electronic message associated with the shipping order. In some examples, the first electronic message may be transmitted by the tracking device. The first electronic message may comprise an indication that the waste departed the initial location and/or is in transit towards the destination (e.g., the waste facility). At 470, responsive to detecting the first event, a first electronic notification corresponding to the first event may be generated. In some examples, the first electronic notification may comprise an indication that the waste is in transit towards the destination. Alternatively and/or additionally, the first electronic notification may comprise an estimated time of arrival of the waste at the destination. At 472, the first electronic notification may be transmitted over a network communication to one or more devices associated with the shipment of waste to the destination. In some examples, the one or more devices may comprise the first device (e.g., associated with the waste generator), the second device (e.g., associated with the waste facility and/or the third device (e.g., associated with the transporter). In some examples, the one or more devices may comprise devices associated with emergency response entities and/or regulators.

In some examples, a second event associated with the shipping order may be detected (e.g., during the monitoring). The second event may be detected by receiving a second electronic message associated with the shipping order. In some examples, the second electronic message may be transmitted by the tracking device. The second electronic message may comprise an indication that the waste that the waste arrived at the destination. Responsive to detecting the second event, a second electronic notification corresponding to the second event may be generated. In some examples, the second electronic notification may comprise an indication that the waste that the waste arrived at the destination. The second electronic notification may be transmitted over a network communication to the one or more devices.

In some examples, a third event associated with the shipping order may be detected (e.g., during the monitoring). The third event may be detected by receiving a third electronic message associated with the shipping order. In some examples, the third electronic message may be transmitted by the tracking device. The third electronic message may comprise an indication that the waste that the waste is scheduled to arrive at the destination later than indicated by the estimated time of arrival. Responsive to detecting the third event, a third electronic notification corresponding to the third event may be generated. In some examples, the third electronic notification may comprise an indication that the waste that the waste is scheduled to arrive at the destination later than indicated by the estimated time of arrival. The third electronic notification may be transmitted over a network communication to the one or more devices.

In some examples, an alert condition associated with the shipping order may be detected (e.g., during the monitoring). The first event may be detected by receiving a fourth electronic message associated with the shipping order. In some examples, the fourth electronic message may be transmitted by the one or more sensors. The first electronic message may comprise an indication of one or more unsafe conditions associated with the waste (e.g., waste spillage, waste temperature changes, etc.). Responsive to detecting the alert condition, a fourth electronic notification corresponding to the alert condition may be generated. In some examples, the fourth electronic notification may comprise an indication of the one or more unsafe conditions associated with the waste. The fourth electronic notification may be transmitted over a network communication to the one or more devices associated with the shipment of waste to the destination.

In some examples, the waste data aggregation platform may generate, maintain and/or update a waste information aggregation database. In some examples, information associated with the profile interface, such as the waste profile, the plurality of parameters of the waste, the one or more documents uploaded using the profile interface, the regulatory information, etc. may be stored in the waste information aggregation database (e.g., in real time). In an example, the information associated with the profile interface may comprise operational company information associated with the waste generator, the waste facility, the transporter and/or other service providers involved in managing the waste. The information associated with the profile interface may comprise company names, phone numbers, fax numbers, contact information, EPA identification numbers, state identification numbers, waste information, common name, the type of the waste, waste generation process, composition of the waste, state waste codes, regulatory waste information, hazardous waste and/or non-hazardous waste specific information, shipping and DOT information, shipping frequency and/or volume of waste shipped, unit of measurement for shipment, container type and/or size, United State DOT shipping name, disposal conditions, user behavior tracking, profile actions, company administration, user administration and/or internal metrics.

In some examples, information associated with the approval interface, such as the approval notice, the expiration date of the approval notice, the approved volume of the waste and/or the conditions for the waste may be stored in the waste information aggregation database (e.g., in real time).

In some examples, information associated with the shipping documentation interface (e.g., shipping documentation interface 704 of FIG. 7), such as the plurality of digital forms, the shipping information, the one or more third inputs, the remaining shipping information, the transporter information and/or the shipping order may be stored in the waste information aggregation database (e.g., in real time). Alternatively and/or additionally, actual load volume associated with the waste received by the waste facility and/or the transporter, a location that the waste was received, ratio of approvals of waste profiles to waste disposed of, etc. may be stored in waste information aggregation database. Accordingly, one or more users may confirm what types of waste was shipped, a quantity of waste that was shipped, a transporter of the waste, whether there were intrastate and/or international shipments of waste, etc.

Figure 7:
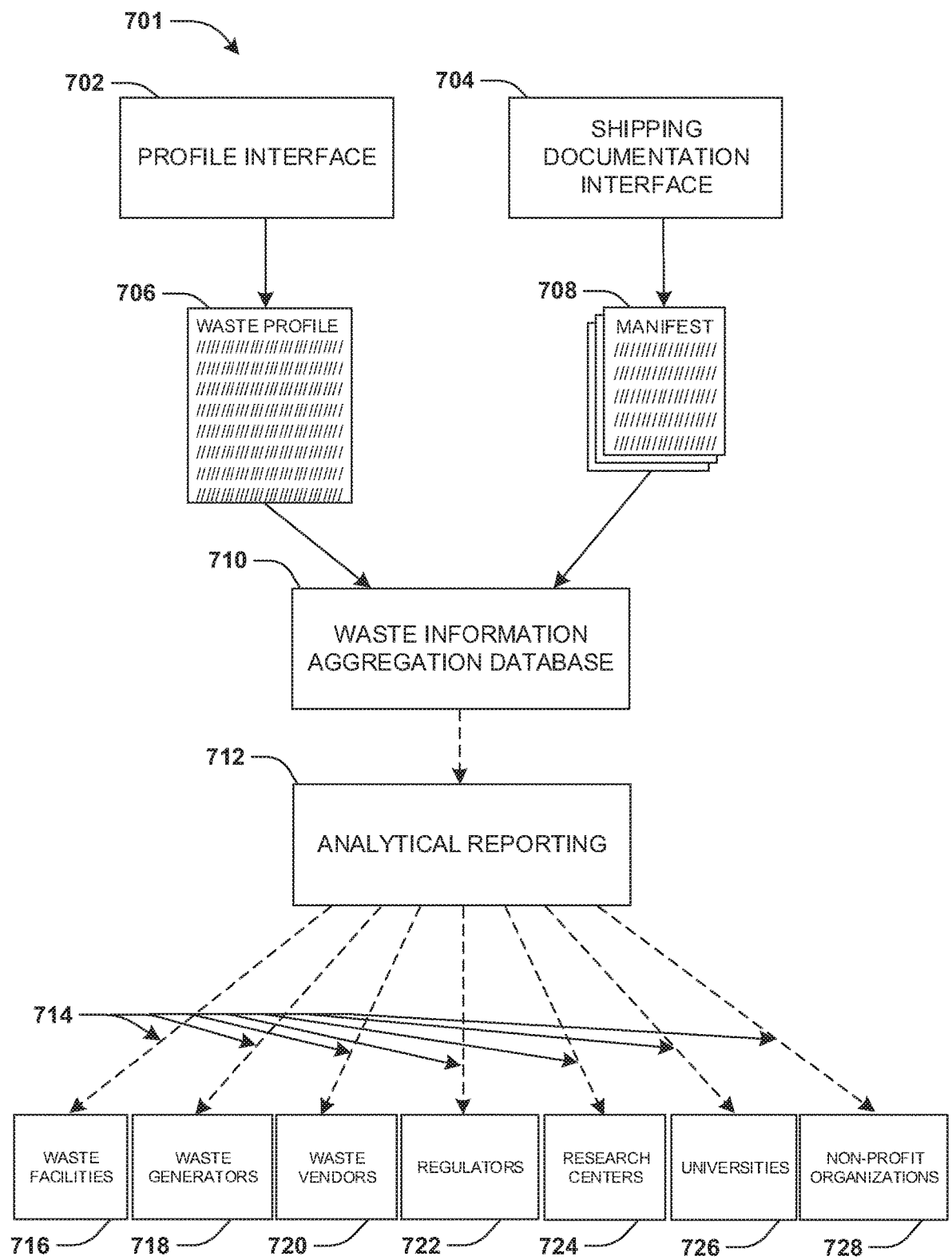
FIG. 7 is a component block diagram illustrating an example system for maintaining and/or updating a waste information aggregation database.

Alternatively and/or additionally, parameters associated with the United States Hazardous Waste Manifest (US HWM) may be stored in the waste information aggregation database (e.g., manifests 708 may be stored within a waste information aggregation database of FIG. 7). For example, parameters associated with US HWM section 9 (e.g., description of waste) may be stored in the waste information aggregation database. Alternatively and/or additionally, parameters associated with US HWM section 10 (e.g., T description, DOT proper shipping name, hazard class, identification number, reportable quantity, packing group, number of containers and/or type of containers) may be stored in the waste information aggregation database. Alternatively and/or additionally, parameters associated with US HWM section 11 (e.g., weight and/or volume) may be stored in the waste information aggregation database. Alternatively and/or additionally, parameters associated with US HWM section 12 (e.g., unit of measure for weight and/or volume) may be stored in the waste information aggregation database. Alternatively and/or additionally, parameters associated with US HWM section 13 (e.g., handling codes and/or waste codes) may be stored in the waste information aggregation database. Alternatively and/or additionally, parameters associated with US HWM section 14 (e.g., special handling instructions and additional information such as waste facility profile approval number, instructions in case of spill/release, additional contact information, etc.) may be stored in the waste information aggregation database.

Alternatively and/or additionally, parameters associated with US HWM section 15 (e.g., waste generator certification) may be stored in the waste information aggregation database. Alternatively and/or additionally, parameters associated with US HWM sections 16-17 (e.g., signature and/or electronic certification, date and time, transporter's certification of receipt of waste) may be stored in the waste information aggregation database. Alternatively and/or additionally, parameters associated with US HWM section 18 (e.g., signature and/or electronic certification, date and time of hand-offs, discrepancies identified and/or corrected on the shipping document by the waste facility) may be stored in the waste information aggregation database. Alternatively and/or additionally, parameters associated with US HWM section 18 (e.g., quantity discrepancies associated with a volume and/or a quantity of the waste (e.g., shipped to the waste facility, waste type discrepancies associated with the type of the waste, shipping container discrepancies associated with the type of the shipping container, residue discrepancies, partial rejection discrepancies, full rejection discrepancies, regulatory reporting information associated with one or more waste processing and/or management methods applied to the waste by the waste facility) may be stored in the waste information aggregation database.

Alternatively and/or additionally, as illustrated in method 400 of FIG. 4A, information associated with the waste exchange platform interface, such as the request for the list of selectable waste options (e.g., the one or more parameters and/or the filters), the selection of the first selectable waste option, the selection of the fifth selectable input, the electronic waste transfer message, the transaction request and/or the electronic transaction message may be stored (e.g., in real time) in the waste information aggregation database.

Alternatively and/or additionally, as illustrated in method 400 of FIG. 4A, information associated the waste information aggregation database may be maintained and/or updated by storing data associated with the plurality of users of the waste exchange platform interface and/or a second plurality of users of the waste data aggregation platform. Accordingly, data associated with the profile interface, the approval interface, the shipping documentation interface, the waste exchange platform interface, the plurality of users and/or the second plurality of users may be aggregated in the waste information aggregation database.

Alternatively and/or additionally, as illustrated in method 400 of FIG. 4A, a plurality of waste information databases may be accessed. In some examples, the plurality of waste information databases may comprise public databases and/or private (e.g., and/or payment based) databases. For example, the waste exchange platform may (e.g., autonomously) mine and/or access the plurality of waste information databases. A plurality of networks and/or a plurality of domains may be mined and/or accessed (e.g., autonomously) by the waste exchange platform. In some examples, the plurality of networks may comprise public networks and/or private (e.g., and/or payment based) networks. In some examples, the plurality of domains may comprise public domains and/or private (e.g., and/or payment based) domains. The plurality of waste information databases, the plurality of networks and/or the plurality of domains may comprise waste information associated with waste, waste generators, waste facilities, waste services, sources of raw materials, etc.

Data comprised within the plurality of waste information databases, the plurality of networks and/or the plurality of domains may be analyzed to identify data records associated with waste. The data records may be extracted from the plurality of waste information databases. Each of the data records may be formatted, in accordance with a first format associated with the waste information aggregation database, to generate a formatted set of data. For example, a scrubbing process and/or a verification process on the data records may be conducted. For example, elements of the data records that are determined to be incorrect, incomplete, improperly formatted, duplicated, etc. may be amended and/or removed. Alternatively and/or additionally, various units (e.g., of measurements) of the data records may be converted into standard units (e.g., of measurements) associated with the waste information aggregation database. The formatted set of data may be stored in the waste information aggregation database.

In some examples, the waste information aggregation database may be maintained and/or updated by periodically (e.g., once per hour, once per day, once per week, etc.) mining and/or accessing the plurality of waste information databases, the plurality of networks and/or the plurality of domains, analyzing data comprised within the plurality of waste information databases to identify data records associated with waste, extracting the data records, formatting each of the data records in accordance with the waste information aggregation database and/or storing a formatted set of data in the waste information aggregation database.

In some examples, the waste exchange platform interface illustrated in method 400 of FIG. 4A may operate independently from the waste data aggregation platform. Alternatively and/or additionally, the waste exchange platform interface may operate jointly with the waste data aggregation platform. For example, responsive to generating an electronic transaction message associated with a user of the waste exchange platform interface attempting to receive one or more services from a waste facility for storage, processing, treatment, disposal, destruction, recycling and/or reuse of waste associated with the user (e.g., and/or performing a different operation associated with the waste exchange platform interface), the user (e.g., and/or a device associated with the user) may be directed to the profile interface of the waste data aggregation platform. Accordingly, the user (e.g., and/or the device) may submit a waste profile for approval by the waste facility.

In some examples, the profile interface, the approval interface and/or the shipping documentation interface of the waste data aggregation platform may operate independently from each other. Alternatively and/or additionally, the profile interface, the approval interface and/or the shipping documentation interface of the waste data aggregation platform may operate jointly with each other.

In some examples, the waste data aggregation platform may analyze the waste information aggregation database to generate a plurality of reports. For example, one or more waste profiles and/or one or more sets of shipping information comprised within the waste data aggregation platform may be analyzed to generate one or more landfill reports comprising effects of disposing waste associated with the one or more waste profiles into a landfill. For example, an AUF report of the one or more landfill reports may be generated based upon an analysis of the one or more waste profiles, the one or more sets of shipping information and/or landfill information corresponding to the landfill. The AUF report may comprise an air space of the landfill used by disposing the waste into the landfill and/or an indication of whether the landfill has enough air space for the waste to be disposed in the landfill. Alternatively and/or additionally, a landfill temperature report of the one or more landfill reports may be generated based upon an analysis of the one or more waste profiles, the one or more sets of shipping information and/or the landfill information. The landfill temperature report may comprise one or more indications of an effect on a temperature of the landfill by disposing the waste in the landfill.

Alternatively and/or additionally, a landfill odor report of the one or more landfill reports may be generated based upon an analysis of the one or more waste profiles, the one or more sets of shipping information and/or the landfill information. The landfill odor report may comprise one or more indications of an effect on an odor of the landfill by disposing the waste in the landfill. Alternatively and/or additionally, a landfill risk report of the one or more landfill reports may be generated based upon an analysis of the one or more waste profiles, the one or more sets of shipping information and/or the landfill information. The landfill risk report may comprise one or more risk indicators of the waste when subject to physical processes, chemical process and/or biological processes. For example, the landfill risk report may comprise indications of changes in mass and/or volume of the waste (e.g., over time). The one or more risk indicators may comprise indications of new compounds being created (e.g., over time) (e.g., within the waste and/or the landfill), indications of different phases (e.g., within the waste and/or the landfill) and/or accurate predictions of a concentration of contaminates in leachate (e.g., within the waste and/or the landfill).

A risk report may be generated based upon an analysis of the one or more waste profiles, the one or more sets of shipping information and/or waste facility information of a waste facility. For example, the risk report may comprise one or more risk indicators a first effect of the waste on surface water, a second effect of the waste on groundwater and/or a third effect of the waste on air. Alternatively and/or additionally, the risk report may comprise a risk mitigation indicator. The risk mitigation indicator may be calculated based upon an analysis of the one or more waste profiles, the one or more sets of shipping information and/or the waste facility information. The risk mitigation indicator may identify a threshold for certain types of waste. Alternatively and/or additionally, the risk report may comprise a wet waste threshold. The wet waste threshold may be calculated based upon an analysis of the one or more waste profiles, the one or more sets of shipping information and/or the waste facility information. The wet waste threshold may identify an amount of wet waste acceptable to the waste facility (e.g., for disposal).

A raw material source report may be generated based upon an analysis of a waste profile and/or shipping information associated with the waste profile. The raw material source report may comprise one or more indications of one or more raw materials comprised within waste associated with the waste profile. The raw material source report may comprise instructions for utilization of the one or more raw materials.

A sustainability report may be generated based upon an analysis of one or more waste profiles, one or more sets of shipping information and/or waste generator information of a waste generator. For example, the sustainability report may comprise sustainability performance indicators of the waste generator. The sustainability performance indicators may comprise a waste generation rate of the waste generator, a diversion rate of waste generated by the waste generator and/or a capture rate of the waste generated by the waste generator. For example, waste that is diverted may be tracked and/or reported. The diversion rate may be indicative of a total sum of diverted waste by weight divided by a total sum of waste generated by waste.

A benchmarking report may be generated based upon an analysis of a plurality of waste profiles, a plurality of sets of shipping information and/or a plurality of sets of waste generator information of a plurality of waste generators. The benchmarking report may comprise comparisons of sustainability performances of waste generators across various industries. Accordingly, the benchmarking report may identify waste generators and/or groups of waste generators with above average diversion rates, identify waste generators and/or groups of waste generators with above average waste reduction rates, identify waste generators with below average diversion rates, etc. Alternatively and/or additionally, the benchmarking report may identify hard-to-recycle waste and/or diversion techniques for the hard-to-recycle waste. In some examples, the benchmarking report and/or one or more sustainability reports may comprise instructions for increasing diversion rates and/or increasing waste reduction rates.

The plurality of reports may result in a greater transparency in management of waste (e.g., and/or materials) and/or cost implications for waste generators. In some examples, the plurality of reports may be used to identify possible improvements to processes for disposing of various types of waste and/or may provide insights on more sustainable practices for the various types of waste. The plurality of reports may be presented and/or transmitted to waste facilities, waste generators, waste vendors, research centers, regulators, government agencies (e.g., homeland security), sustainability organizations, companies, insurance companies, non-profit organizations, media companies, data companies, financial companies, etc.

In some examples, the plurality of reports may comprise consistent units (e.g., of measurement). For example, inconsistent units (e.g., of measurement) comprised in the waste information aggregation database may be converted into the consistent units (e.g., of measurement). Alternatively and/or additionally, the plurality of reports may comprise consistent terminology. For example, inconsistent terminology comprised in the waste information aggregation database may be converted into the consistent terminology.

FIGS. 5A-5G illustrate examples of a system 501 for managing waste. A first user, such as user Jake, (e.g., and/or a first device 500 associated with the first user) may access and/or interact with a service, such as a website, an application, etc. that provides a waste exchange platform for viewing, browsing through, searching for, etc. waste items (e.g., waste facilities, waste vendors associated with waste products and/or waste services for disposal of waste, sources of raw materials, etc.).

Figure 5A:
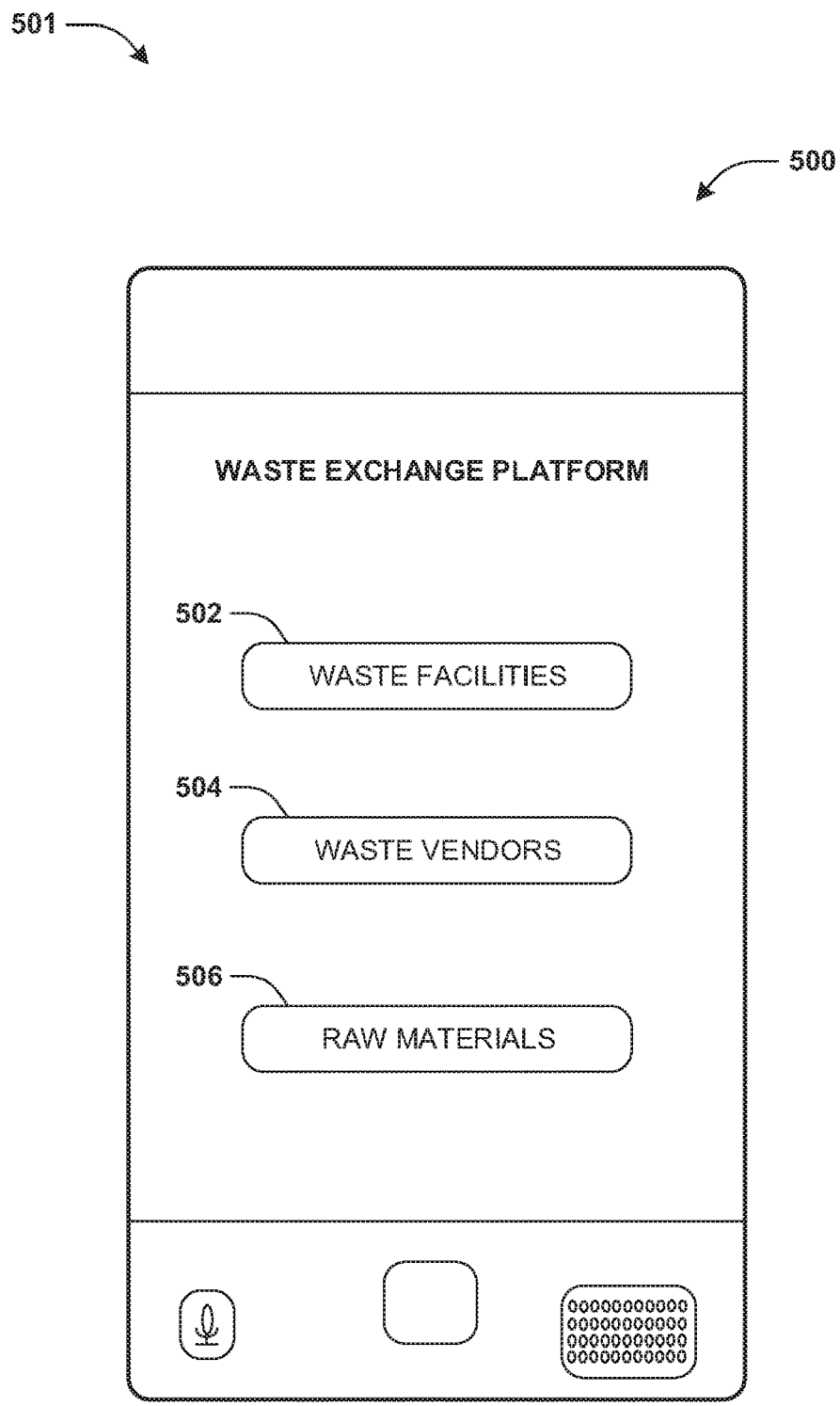
FIG. 5A is a component block diagram illustrating an example system for managing waste, where a graphical user interface of a first device is being controlled to display a waste exchange platform interface.

FIG. 5A illustrates a graphical user interface of the first device 500 being controlled to display a waste exchange platform interface (e.g., of the waste exchange platform). In some examples, the waste exchange platform interface may comprise a first selectable input 502 "WASTE FACILITIES" corresponding to (e.g., searching for) waste facilities. Alternatively and/or additionally, the waste exchange platform interface may comprise a second selectable input 504 "WASTE VENDORS" corresponding to (e.g., searching for) waste vendors. Alternatively and/or additionally, the waste exchange platform interface may comprise a third selectable input 506 "RAW MATERIALS" corresponding to (e.g., searching for) raw materials. For example, a selection of the first selectable input 502 may be received (e.g., via the waste exchange platform interface).

Figure 5B:
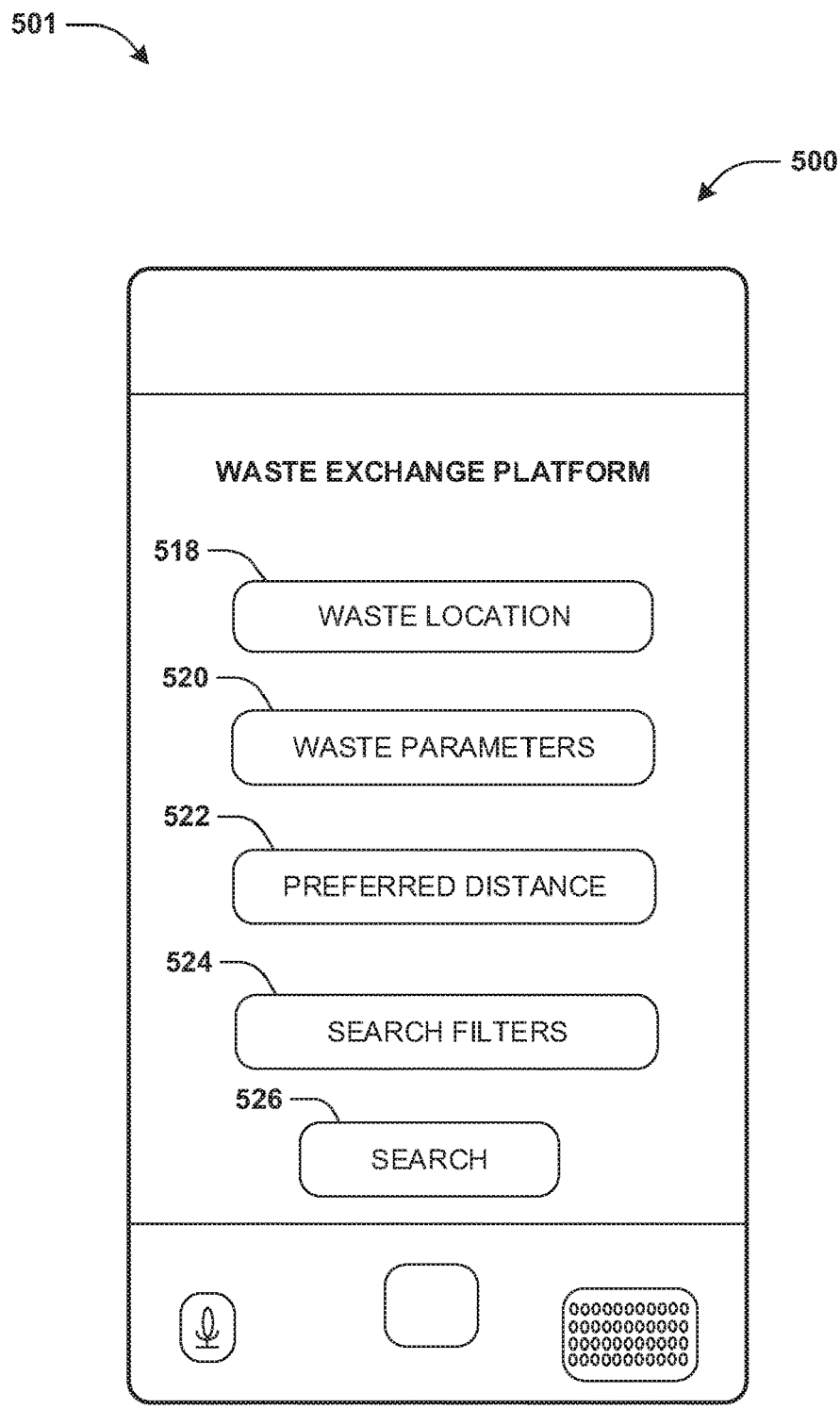
FIG. 5B is a component block diagram illustrating an example system for managing waste, where a graphical user interface of a first device is being controlled to display a waste exchange platform interface.

FIG. 5B illustrates the graphical user interface of the first device 500 being controlled to display the waste exchange platform interface. In some examples, the waste exchange platform interface may comprise a fourth selectable input 518 "WASTE LOCATION" corresponding to a geographic location (e.g., and/or a geographic area) of waste that the first user may want to undergo storage, processing, treatment, disposal, destruction, recycling and/or reuse. Alternatively and/or additionally, the waste exchange platform may comprise a fifth selectable input 520 "WASTE PARAMETERS" corresponding to one or more types of waste (e.g., and/or a composition of materials) corresponding to the waste. Alternatively and/or additionally, the waste exchange platform may comprise a sixth selectable input 522 "PREFERRED DISTANCE" corresponding to a preferred distance (e.g., of a waste facility) from the geographic location of the waste. In some examples, search criteria may be inputted (e.g., by the first user and/or the first device) using the fourth selectable input 518, the fifth selectable input 520 and/or the sixth selectable input 522. The waste exchange platform interface may comprise a seventh selectable input 524 "SEARCH FILTERS" corresponding to filters to be applied when performing a search for waste facilities. In some examples, the filters may be inputted using the seventh selectable input 524. The waste exchange platform interface may comprise an eighth selectable input 526 "SEARCH" corresponding to a request for a list of selectable waste options. For example, a selection of the eighth selectable input 526 may be received (e.g., via the waste exchange platform interface). Responsive to receiving the selection of the eight selectable input 526, a waste information aggregation database may be analyzed to identify waste items (e.g., waste facilities) based upon the search criteria. The list of selectable waste options may be generated based upon the waste items. The list of selectable waste options may be transmitted to the first device 500.

Figure 5C:
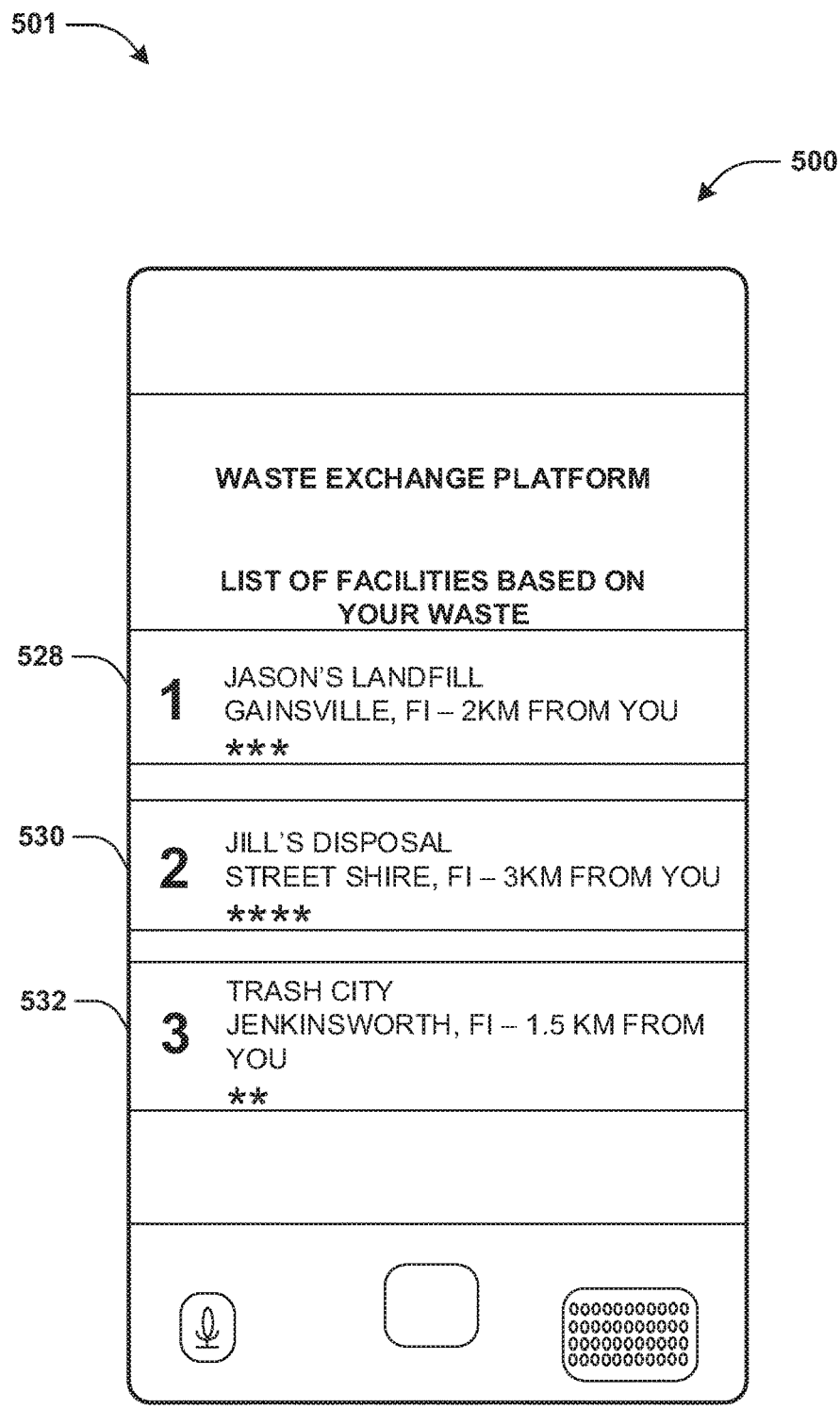
FIG. 5C is a component block diagram illustrating an example system for managing waste, where a graphical user interface of a first device is being controlled to display a waste exchange platform interface.

FIG. 5C illustrates the graphical user interface of the first device 500 being controlled to display the waste exchange platform interface. In some examples, the waste exchange platform interface may comprise the list of selectable waste options. The list of selectable waste options may comprise a first selectable waste option 528 corresponding to a first waste facility "JASON'S LANDFILL", a second selectable waste option 530 corresponding to a second waste facility "JILL'S DISPOSAL" and/or a third selectable waste option 532 corresponding to a third waste facility "TRASH CITY". In some examples, each selectable waste option of the list of selectable waste options may comprise a name of a company corresponding to a waste facility, a location (e.g., an address) of a waste facility, a distance of a waste facility from the waste and/or a rating of a waste facility. For example, a selection of the first selectable waste option 528 may be received (e.g., via the waste exchange platform interface).

Figure 5D:
FIG. 5D is a component block diagram illustrating an example system for managing waste, a graphical user interface of a first device is being controlled to display a waste exchange platform interface.
Figure 5E:
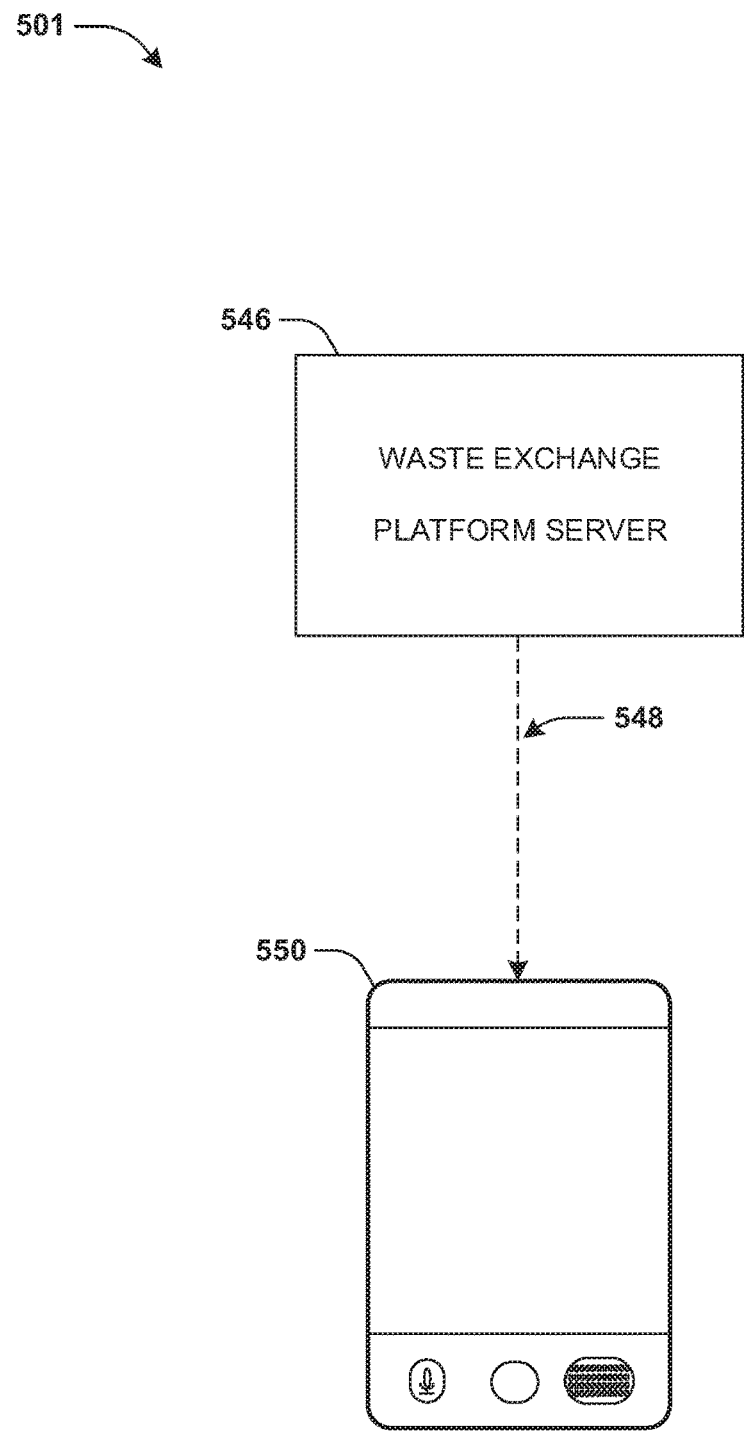
FIG. 5E is a component block diagram illustrating an example system for managing waste, where an electronic waste transfer message is transmitted to a second device.

FIG. 5D illustrates the graphical user interface of the first device 500 being controlled to display the waste exchange platform interface. In some examples, the waste exchange platform interface may comprise detailed characteristics of the first waste facility. In some examples, the waste exchange platform interface may comprise a ninth selectable input 540 "REQUEST SERVICE". For example, a selection of the ninth selectable input 540 may be received (e.g., via the waste exchange platform interface). FIG. 5E illustrates a waste exchange platform server 546 transmitting an electronic waste transfer message 548 to a second device 550. In some examples, responsive to receiving the selection of the ninth selectable input 540, the electronic waste transfer message 548 may be generated (e.g., based upon one or more selected inputs). The electronic waste transfer message 548 may be transmitted to the second device 550 over a network communication. The second device 550 may be associated with a second user of the waste exchange platform interface. The second user may be associated with (e.g., and/or identified by) the first selectable waste option 528. For example, the second user may be an employee, a manager, etc. of the first waste facility.

Figure 5F:
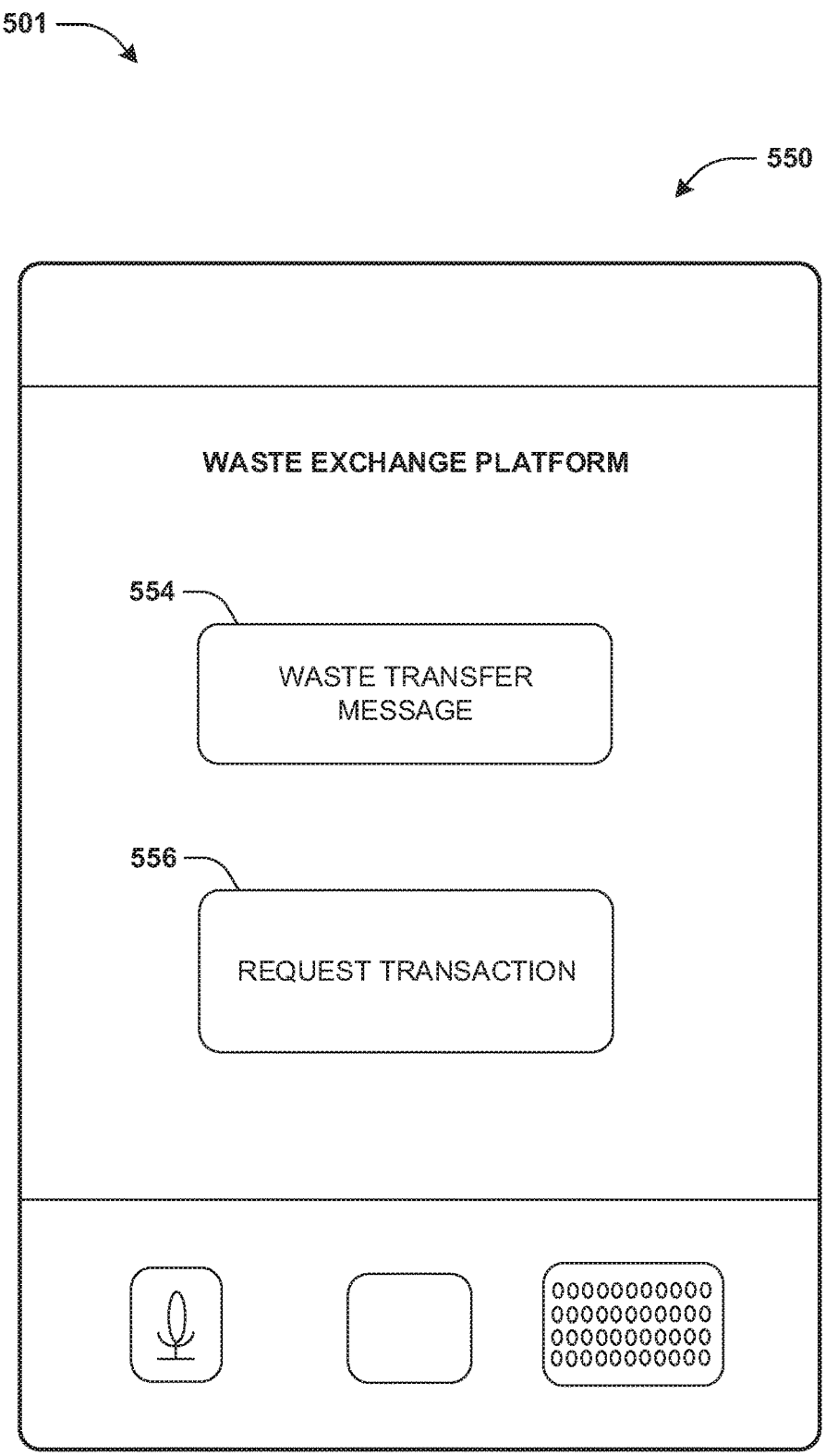
FIG. 5F is a component block diagram illustrating an example system for managing waste, a graphical user interface of a second device is being controlled to display a waste exchange platform interface.

FIG. 5F illustrates the graphical user interface of the second device 550 being controlled to display the waste exchange platform interface. In some examples, the waste exchange platform interface may comprise a tenth selectable input 554 "WASTE TRANSFER MESSAGE" corresponding to (e.g., viewing) the electronic waste transfer message and/or an eleventh selectable input 556 "REQUEST TRANSACTION" corresponding to a transaction request. For example, a selection of the tenth selectable input 554 may be received (e.g., via the waste exchange platform interface). Responsive to receiving the selection of the tenth selectable input 554, the electronic waste transfer message may be presented to the second user. A selection of the eleventh selectable input 556 may be received (e.g., via the waste exchange platform interface).

Figure 5G:
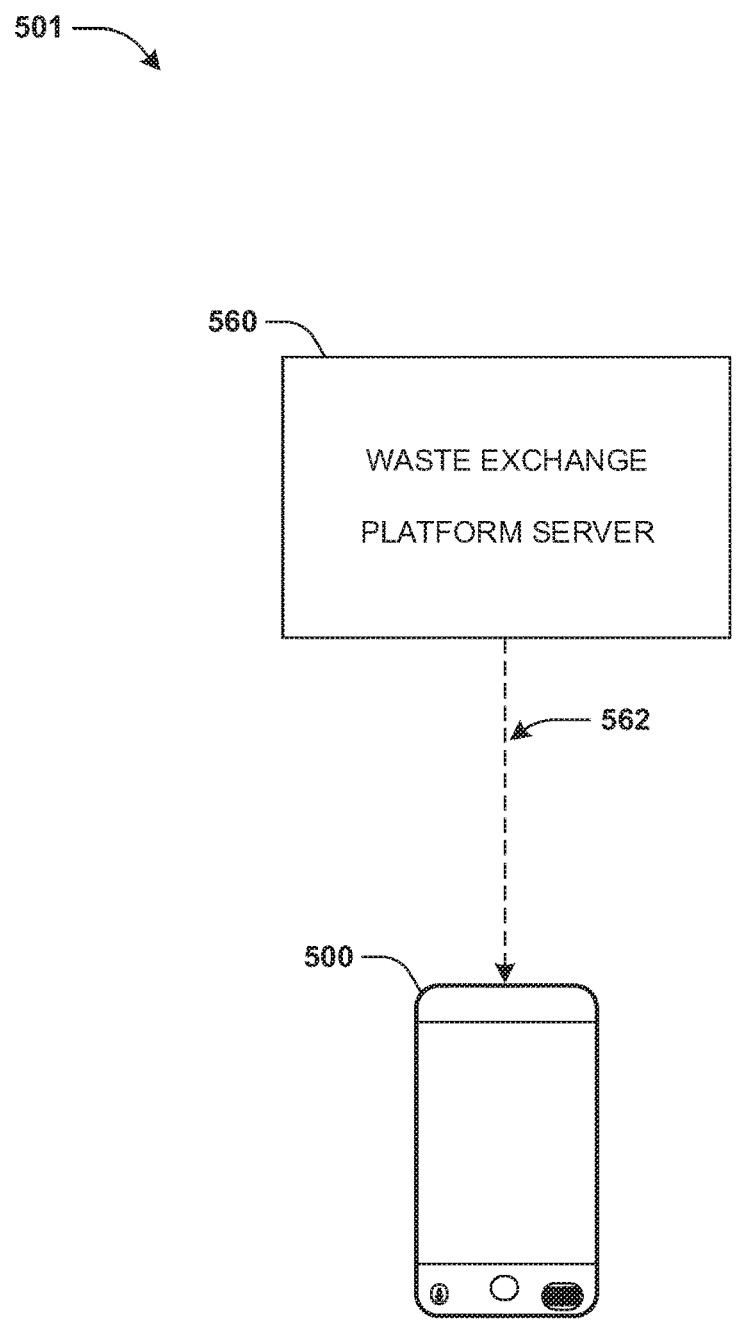
FIG. 5G is a component block diagram illustrating an example system for managing waste, where an electronic transaction message is transmitted to a first device.

FIG. 5G illustrates a waste exchange platform server 560 transmitting an electronic transaction message 562 to the first device 500. In some examples, responsive to receiving the selection of the eleventh selectable input 556 (e.g., corresponding to the transaction request), the electronic transaction message 562 comprising transaction information (e.g., cost, payment schedule, services provided, etc.) associated with the first selectable waste option 528 may be generated. The electronic transaction message 562 may be transmitted to the first device 500 over a network communication.

FIGS. 6A-6E illustrate examples of a system 601 for managing waste. A first user, such as user James, (e.g., and/or a first device 600 associated with the first user) may access and/or interact with a service, such as a website, an application, etc. that provides a waste data aggregation platform for managing waste.

Figure 6A:
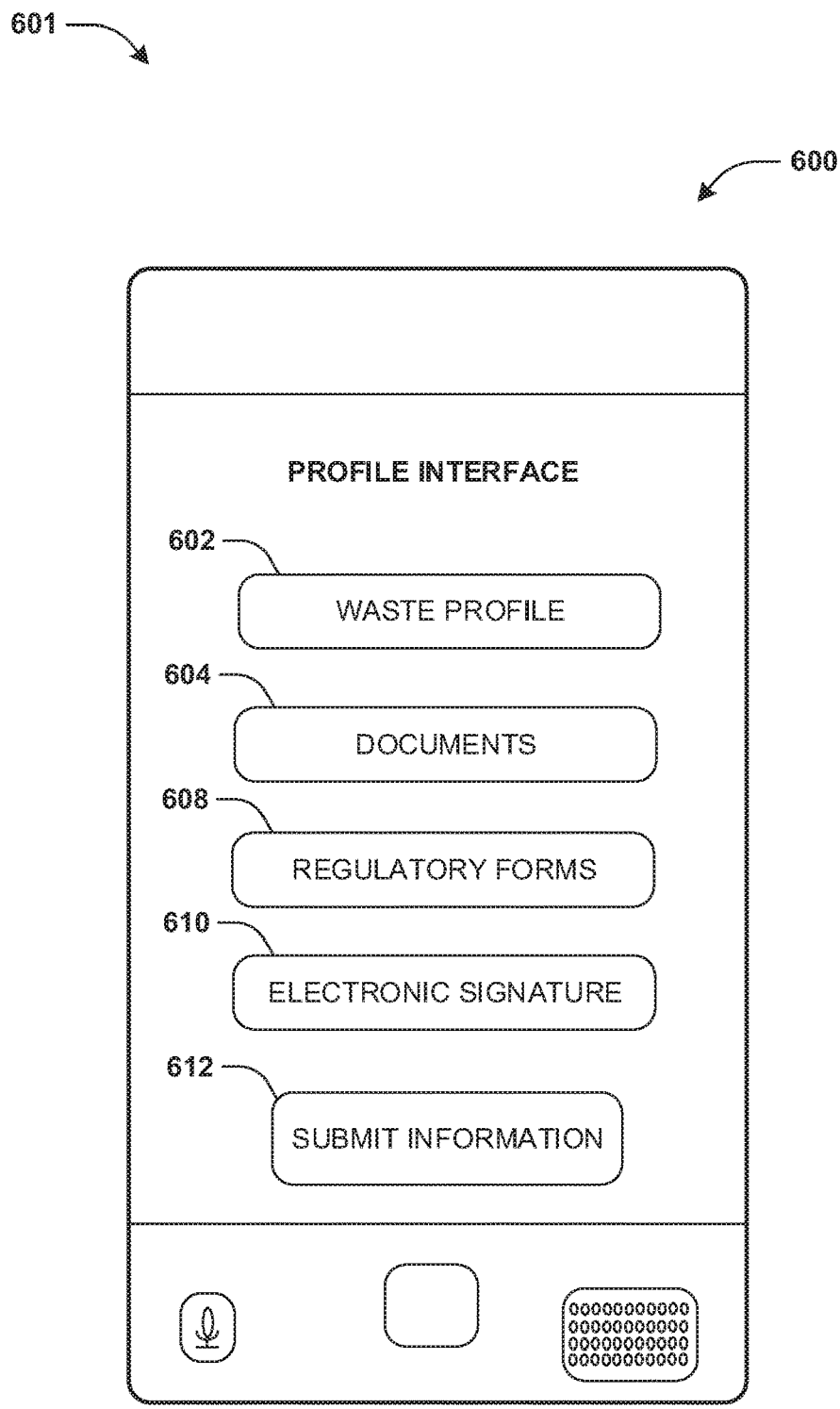
FIG. 6A is a component block diagram illustrating an example system for managing waste, where a graphical user interface of a first device is controlled to display a profile interface of a waste data aggregation platform.

FIG. 6A illustrates a graphical user interface of the first device 600 being controlled to display a profile interface. The profile interface may provide for the first user (e.g., and/or the first device 600) to submit a waste profile comprising parameters of waste that the first user may want stored, processed, treated, disposed of, destructed, recycled and/or reused by a waste facility. For example, the first user may be associated with a waste generator generating the waste. In some examples, the profile interface may comprise a first selectable input 602 "WASTE PROFILE" corresponding to the waste profile. Alternatively and/or additionally, the profile interface may comprise a second selectable input 604 "DOCUMENTS" corresponding to one or more documents. Alternatively and/or additionally, the profile interface may comprise a third selectable input 608 "REGULATORY FORMS" corresponding to regulatory forms. Alternatively and/or additionally, the profile interface may comprise a fourth selectable input 610 "ELECTRONIC SIGNATURE" corresponding to an electronic certification. Alternatively and/or additionally, the profile interface may comprise a fifth selectable input 612 "SUBMIT INFORMATION" corresponding to submitting the waste profile for approval by the waste facility.

In some examples, responsive to receiving a selection of the first selectable input 602, the profile interface may provide for the first user (e.g., and/or the first device 600) to enter one or more inputs into a digital waste profile form. The waste profile may be generated based upon the one or more inputs. Alternatively and/or additionally, responsive to receiving a selection of the second selectable input 604, the profile interface may provide for the first user (e.g., and/or the first device 600) to upload one or more documents (e.g., analytical reports, MSDS, etc.) associated with waste and/or the waste profile. Alternatively and/or additionally, responsive to receiving a selection of the third selectable input 608, the profile interface may provide for the first user (e.g., and/or the first device 600) to upload regulatory forms and/or enter regulatory information into the regulatory forms. Alternatively and/or additionally, responsive to receiving a selection of the fourth selectable input 610, the profile interface may provide for electronic certification by the first user upon completion of the waste profile. Alternatively and/or additionally, responsive to receiving a selection of the fifth selectable input 612, the waste profile may be submitted for approval by the waste facility.

Figure 6B:
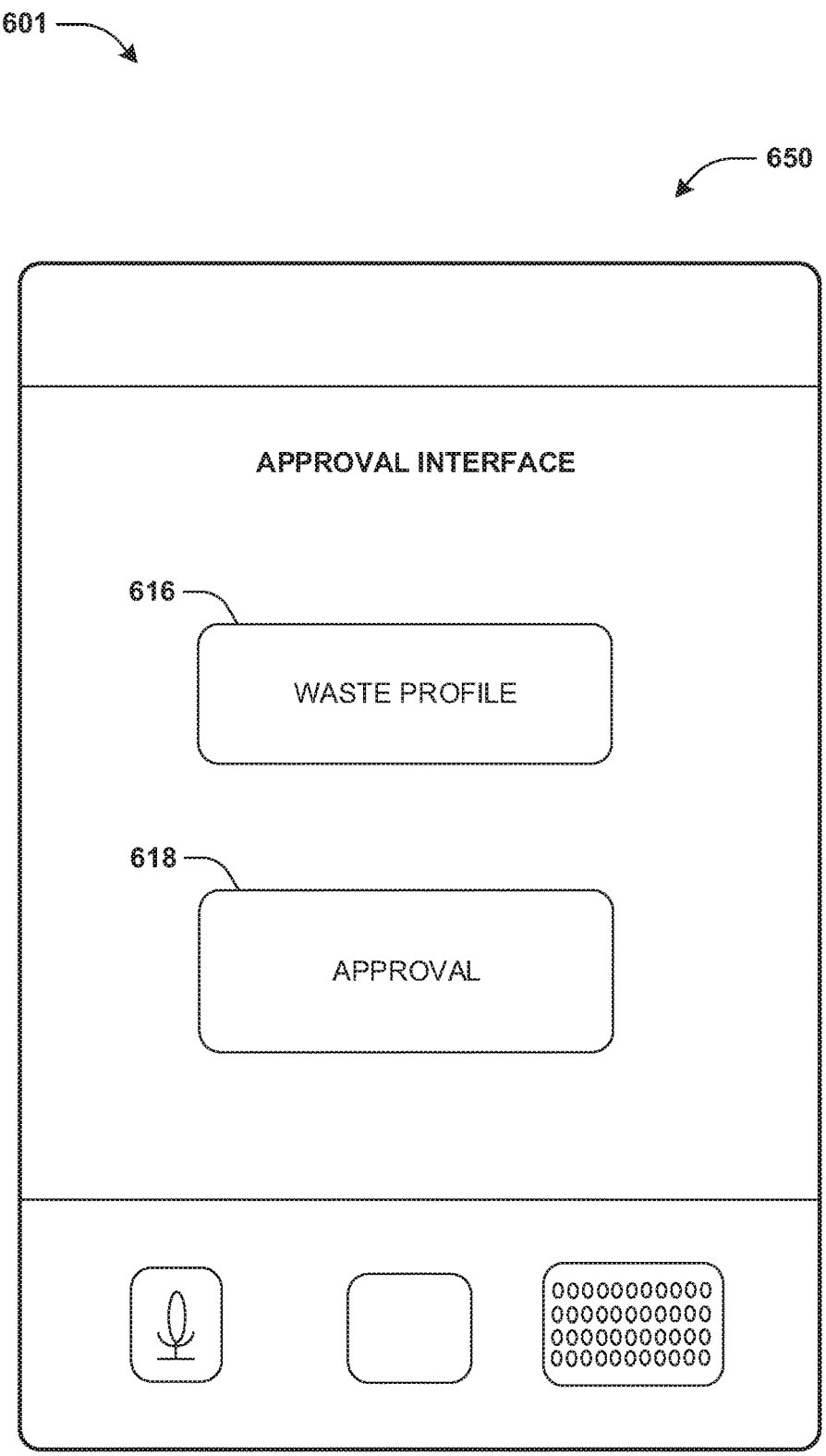
FIG. 6B is a component block diagram illustrating an example system for managing waste, where a graphical user interface of a second device is controlled to display an approval interface of a waste data aggregation platform.

FIG. 6B illustrates a graphical user interface of a second device 650 being controlled to display an approval interface of the waste data aggregation platform. The second device 650 may be associated with a second user and/or the waste facility. The approval interface may comprise a sixth selectable input 616 "WASTE PROFILE" corresponding to the waste profile and/or a seventh selectable input 618 "APPROVAL" corresponding to an approval notice. Responsive to receiving a selection of the sixth selectable input 616, the approval interface may provide for the second user to view the waste profile, the one or more documents and/or the regulatory forms. A selection of the seventh selectable input 618 may be received (e.g., via the approval interface).

Figure 6C:
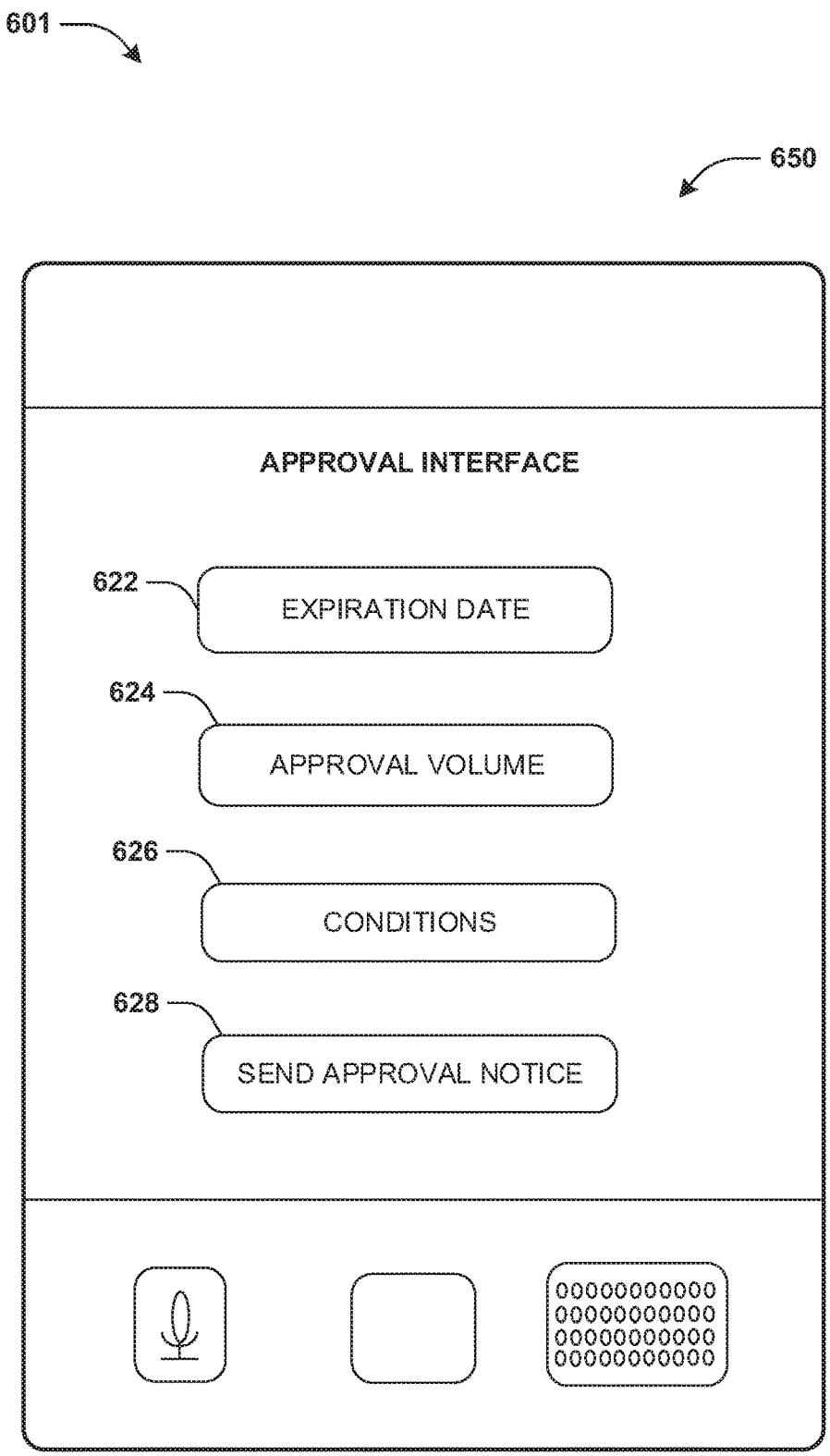
FIG. 6C is a component block diagram illustrating an example system for managing waste, where a graphical user interface of a second device is controlled to display an approval interface of a waste data aggregation platform.

FIG. 6C illustrates the graphical user interface of the second device 650 being controlled to display the approval interface of the waste data aggregation platform. The approval interface may comprise an eighth selectable input 622 "EXPIRATION DATE" corresponding to an expiration date of the approval notice. Alternatively and/or additionally, the approval interface may comprise a ninth selectable input 624 "APPROVAL VOLUME" corresponding to an approved volume of the waste. Alternatively and/or additionally, the approval interface may comprise a tenth selectable input 626 "CONDITIONS" corresponding to conditions for the waste. Alternatively and/or additionally, the approval interface may comprise an eleventh selectable input 628 "SEND APPROVAL NOTICE" corresponding to transmission of the approval notice to the first device.

Responsive to a receiving a selection of the eighth selectable input 622, the approval interface may provide for the second user (e.g., and/or the second device 650) to input the expiration date of the approval notice. Alternatively and/or additionally, responsive to receiving a selection of the ninth selectable input 624, the approval interface may provide for the second user (e.g., and/or the second device 650) to input the approved volume of the waste. Alternatively and/or additionally, responsive to a receiving a selection of the tenth selectable input 626, the approval interface may provide for the second user (e.g., and/or the second device 650) to input the conditions for the waste. Alternatively and/or additionally, responsive to a receiving a selection of the eleventh selectable input 628, the approval notice may be transmitted to the first device 600.

Figure 6D:
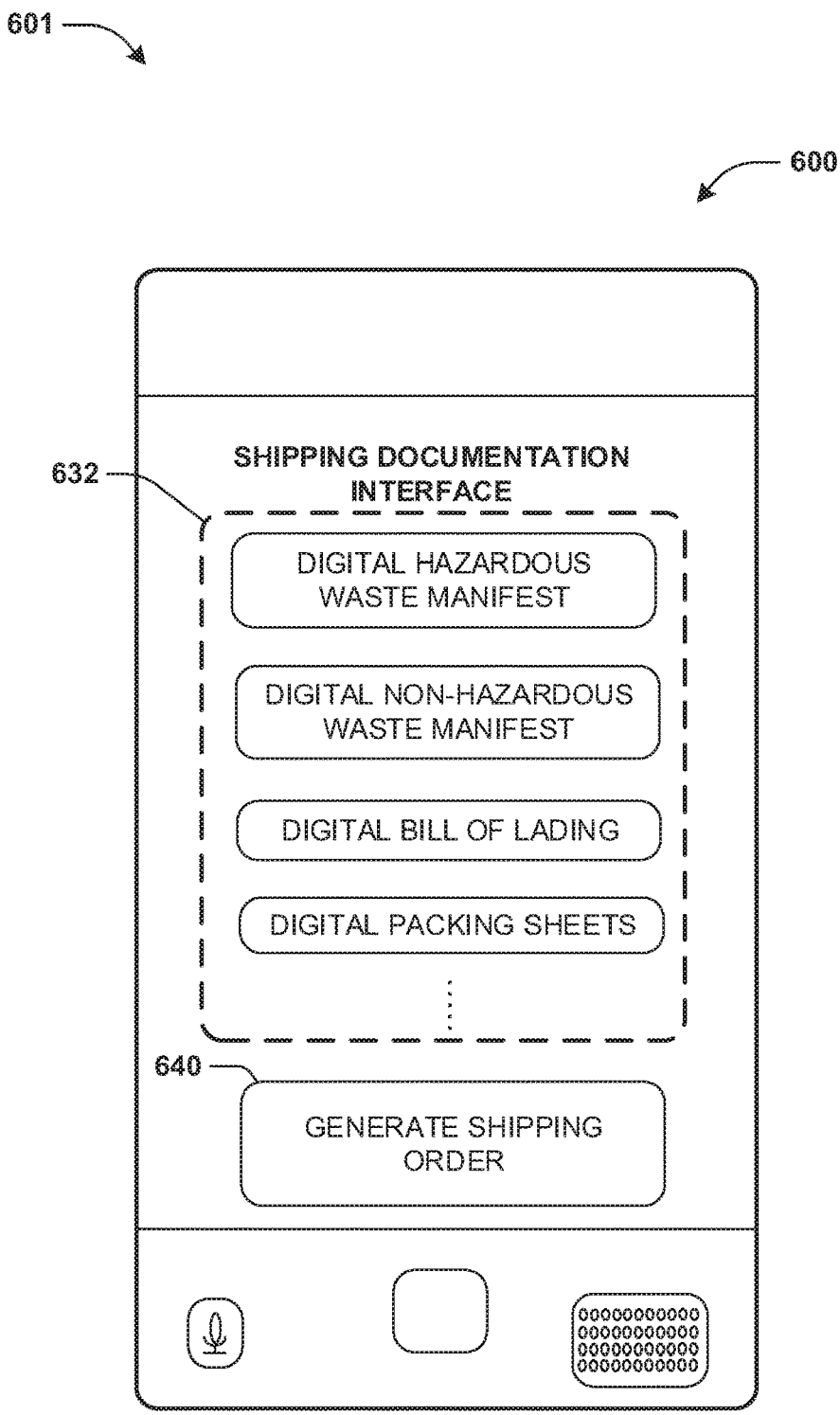
FIG. 6D is a component block diagram illustrating an example system for managing waste, where a graphical user interface of a first device is controlled to display a shipping documentation interface of a waste data aggregation platform.

FIG. 6D illustrates the graphical user interface of the first device 600 being controlled to display a shipping documentation interface of the waste data aggregation platform. The shipping documentation interface may comprise a plurality of selectable inputs 632 corresponding to a plurality of digital forms defining shipping parameters of shipment of the waste to the waste facility. Shipping information may be entered into the plurality of digital forms (e.g., automatically) based upon the waste profile. Alternatively and/or additionally, remaining shipping information may be entered into (e.g., incomplete) portions of the plurality of digital forms (e.g., manually) by the first user (e.g., and/or the first device 600). The plurality of digital forms may be viewed and/or shipping information may be entered into the plurality of digital forms by the first user (e.g., and/or the first device 600) responsive to receiving selections of the plurality of selectable inputs 632. In some examples, the shipping documentation interface may comprise a twelfth selectable input 640 corresponding to generation of a shipping order based upon the shipping information.

Figure 6E:
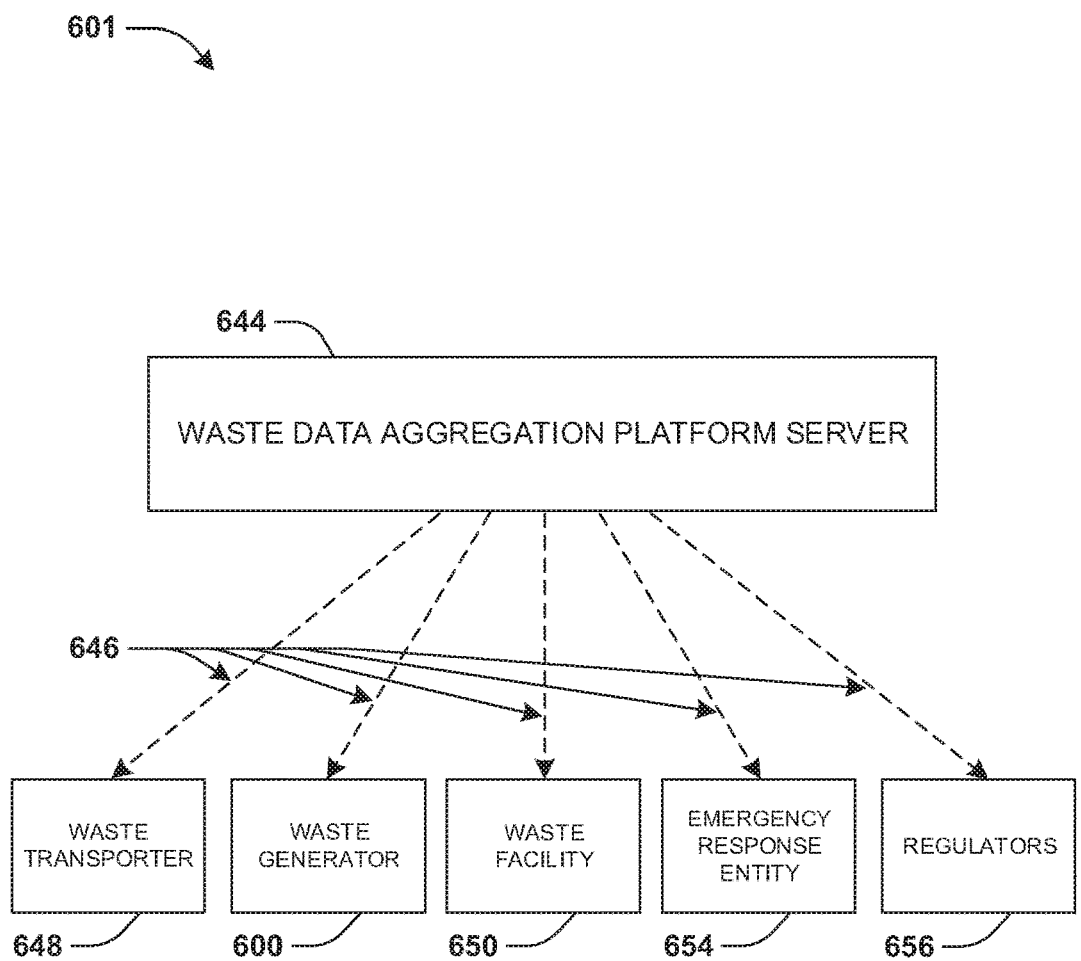
FIG. 6E is a component block diagram illustrating an example system for managing waste, where a plurality of electronic notifications are transmitted to a plurality of devices.

FIG. 6E illustrates a waste data aggregation platform server 644 transmitting a plurality of electronic notifications 646 to a plurality of devices, comprising a third device 648 associated with a waste transporter of the waste, the first device 600, the second device 650 associated with the waste facility, a fourth device 654 associated with an emergency response entity and/or a fifth device 656 associated with a regulator. For example, a plurality of events associated with transportation of the waste to the waste facility may be detected. The plurality of electronic notifications 646 may be generated based upon the plurality of events. The plurality of electronic notifications 646 may be transmitted to the plurality of devices.

FIG. 7 illustrates a system 701 for maintaining and/or updating a waste information aggregation database 710. For example, a profile interface 702 of a waste data aggregation platform may be used to generate a plurality of waste profiles 706 associated with a plurality of waste generators. The plurality of waste profiles 706 (e.g., and/or information associated with the plurality of waste profiles 706) may be stored in the waste information aggregation database 710 (e.g., in real time). Alternatively and/or additionally, a shipping documentation interface 704 of the waste data aggregation platform may be used to generate manifests 708 comprising a plurality of sets of shipping information 708 associated with a second plurality of waste generators. The plurality of sets of shipping information within the manifests 708 may be stored in the waste information aggregation database 710 (e.g., in real time).

In some examples, an analytical reporting module 712 may analyze the waste information aggregation database 710 to generate a plurality of reports 714. The plurality of reports 714 may comprise one or more landfill reports, risk reports, sustainability reports, benchmarking reports associated with waste generators, waste facilities, groups of waste generators and/or groups of waste facilities. The plurality of reports 714 may be presented and/or transmitted to waste facilities 716, waste generators 718, waste vendors 720, regulators 722, research centers 724, universities 726, nonprofit organizations 728, etc.

It may be appreciated that the disclosed subject matter may assist a user (e.g., and/or a device associated with the user) in searching for and/or identifying waste facilities, waste vendors and/or sources of raw materials, managing a waste profile and/or a shipping order of waste and/or determining a sustainability performance of a waste generator associated with the user. It may be appreciated that the disclosed subject matter may assist a second user associated with a waste facility (e.g., and/or a second device associated with the second user) in managing a plurality of waste profiles received from waste generators, managing approval notices associated with the plurality of waste profiles, determining effects of waste on the waste facility and/or determining risks of disposing of the waste in the waste facility.

Implementation of at least some of the disclosed subject matter may lead to benefits including, but not limited to, enabling the user to efficiently, quickly and accurately identify waste facilities, waste vendors and/or sources of raw materials, and facilitate the movement of waste from physical location to physical location in an efficient and cost-effective manner (e.g., as a result of a waste exchange platform interface enabling the user to browse through, view and/or search for waste facilities, waste vendors and/or sources of raw materials, as a result of enabling the user to apply filters when searching for waste facilities, waste vendors and/or sources of raw materials, as a result of each selectable waste option of a list of selectable waste options presented to the user comprising one or more characteristics of a corresponding waste item, etc.).

Alternatively and/or additionally, implementation of at least some of the disclosed subject matter may lead to benefits including improving the speed and ease by which waste-related information is processed and transferred between devices and/or improving interfaces usable for facilitating the movement of waste. Data from various sources may be aggregated and manipulated in a manner that results in waste-related actions associated with the data being performed in less time, with less overhead, using less resources, etc. At least some of the disclosed subject matter may further provide for an improved platform for communication (e.g., over a network) between remote devices of users associated with waste-related actions, which may increase the speed at which communication may be established and/or decrease obstacles to effective communication.

Alternatively and/or additionally, implementation of at least some of the disclosed subject matter may lead to benefits including enabling the user to efficiently, quickly and accurately manage and/or generate the waste profile (e.g., as a result of the profile interface providing the digital waste profile form for the user to enter inputs into electronically rather than filling out a paper waste profile form, as a result of the profile interface enabling the user to upload documents and/or regulatory forms associated with the waste profile electronically rather than managing and/or transmitting paper documents and/or paper regulatory forms, as a result of the profile interface assisting the user in completing the digital waste profile form and/or other forms by providing an alternate form that may be used to automatically generate the waste profile and/or automatically enter information into the digital waste profile form, as a result of using account information of the user to complete the digital waste profile form, as a result of enabling the user to duplicate the waste profile to generate a duplicated waste profile to be used later, etc.).

Alternatively and/or additionally, implementation of at least some of the disclosed subject matter may lead to benefits including enabling the user to efficiently, quickly and accurately manage and/or generate shipping documents (e.g., as a result of a shipping documentation interface providing a plurality of digital forms defining shipping parameters rather than filling out a plurality of paper forms defining the shipping parameters, as a result of entering shipping information into the plurality of digital forms automatically based upon the waste profile, as a result of generating a shipping order of the waste to the waste facility, etc.).

Alternatively and/or additionally, implementation of at least some of the disclosed subject matter may lead to benefits including enabling the user, the second user associated with the waste facility and/or other entities such as regulators, transporters of the waste and/or emergency response entities to track the waste during transportation of the waste by receiving notifications associated with events of the transportation.

Alternatively and/or additionally, implementation of at least some of the disclosed subject matter may lead to benefits including enabling the user to develop an understanding of a sustainability performance of the waste generator and/or how to improve the sustainability performance of the waste generator.

Alternatively and/or additionally, implementation of at least some of the disclosed subject matter may lead to benefits including enabling the second user associated with the waste facility to efficiently, quickly and/or accurately manage a plurality of approval notices corresponding to a plurality of waste profiles received from waste generators.

Alternatively and/or additionally, implementation of the at least some of the disclosed subject matter may lead to benefits including enabling the second user to develop an understanding of effects of different types of waste on the waste facility and/or risks of disposing the waste in the waste facility.

Alternatively and/or additionally, implementation of at least some of the disclosed subject matter may lead to benefits including a reduction in (e.g., and/or an improved usability of) screen space and/or an improved usability of a display (e.g., of the device) (e.g., as a result of the waste exchange platform enabling the user to browse, view and/or search for waste facilities, waste vendors and/or sources of raw materials, as a result of enabling the user to view characteristics of the waste facilities, waste vendors and/or sources of raw materials without opening a separate page, as a result of enabling the user to communicate questions and/or comments to users associated with the waste facilities, the waste vendors and/or the sources of raw materials without needing to open or install a separate application, etc.).

In some examples, at least some of the disclosed subject matter may be implemented on a client device, and in some examples, at least some of the disclosed subject matter may be implemented on a server (e.g., hosting a service accessible via a network, such as the Internet).

It may be appreciated that "waste" used herein may describe a spent item or material, a derivative and/or a by-product of a process (e.g., a waste stream), unwanted materials left over from a process or refuse from places of human or animal habitation, and comprises hazardous waste (e.g., industrial waste and household waste), non-hazardous waste (e.g., industrial waste and municipal solid waste), recyclables, organics and/or manufacturing by-products.

Figure 8:
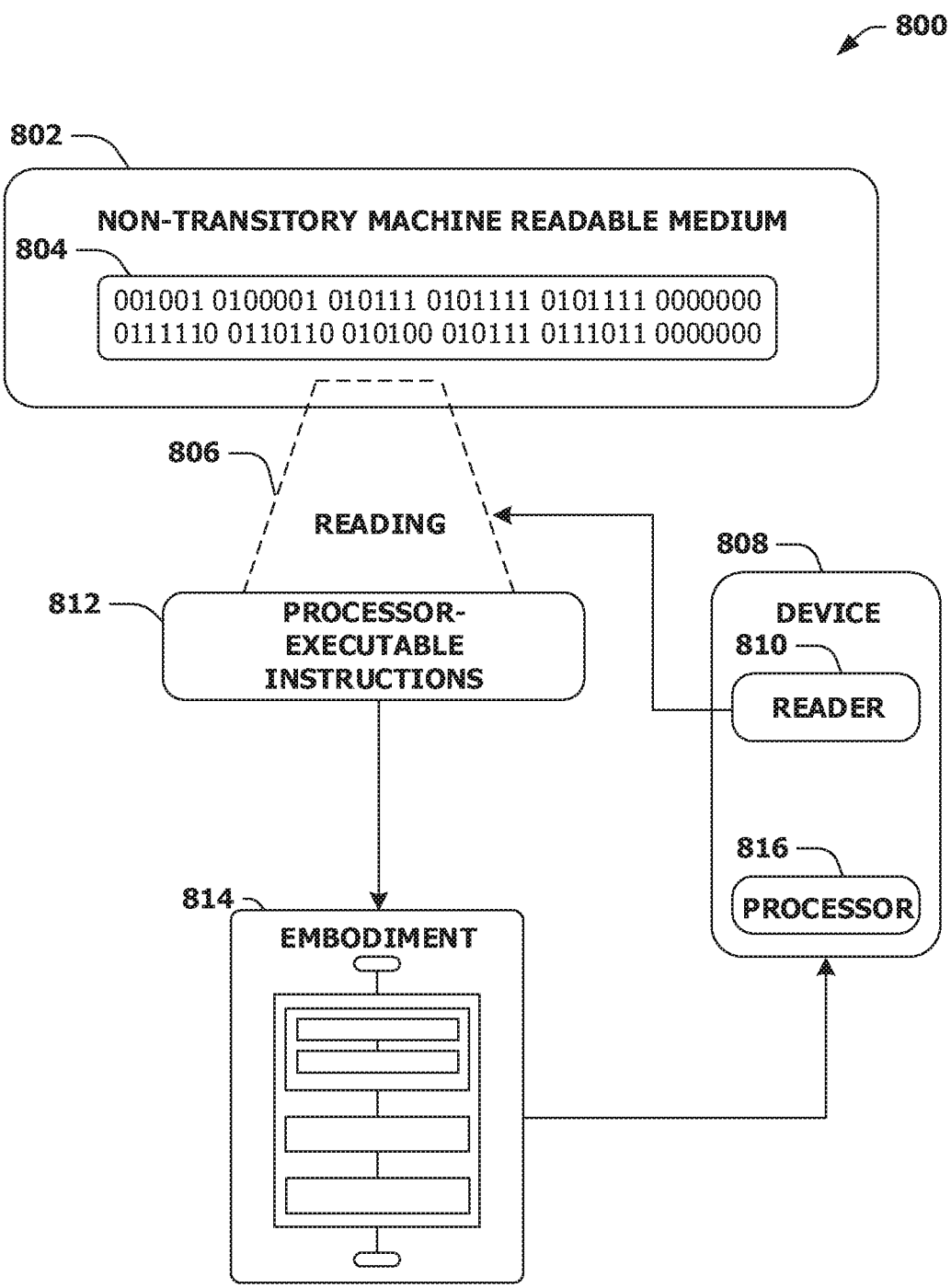
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein (e.g., embodiment 814).

The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk).

The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812.

In some embodiments, the processor-executable instructions 812, when executed, cause performance of operations, such as at least some of the example method 400 of FIG. 4A and/or the example method 450 of FIG. 4B, for example. In some embodiments, the processor-executable instructions 812 are configured to cause implementation of a system, such as at least some of the example system 501 of FIGS. 5A-5F, the example system 601 of FIGS. 6A-6E and/or the example system 701 of FIG. 7, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
extracting data records, comprising data associated with waste, from a plurality of waste information databases;
formatting each of the data records, in accordance with a first format associated with a waste information aggregation database, by scrubbing and converting the data records to generate a formatted set of data, wherein the scrubbing comprises amending or removing elements of the data records identified as being incorrect, incomplete, improperly formatted, or duplicated, and wherein the formatting comprises converting between units of measurements;
storing the formatted set of data in the waste information aggregation database;
controlling a graphical user interface to display a waste exchange platform interface comprising one or more selectable inputs;
receiving, via the waste exchange platform interface, a request for a list of selectable waste options from a device associated with a user of the waste exchange platform interface, wherein the request comprises one or more parameters received via the one or more selectable inputs;
analyzing the formatted set of data in the waste information aggregation database to identify waste items based upon the one or more parameters;
generating and transmitting the list of selectable waste options, corresponding to the waste items, to the device; and
in response to receiving a selection of a first selectable waste option from the list of selectable waste options, generating an electronic waste transfer message based upon the first selectable waste option, wherein the generating comprise:
populating the electronic waste transfer message with shipping information automatically derived from a waste profile; and
populating the electronic waste transfer message with a risk report indicating an effect upon a waste facility if the waste facility accepts a waste item associated with the first selectable waste option, wherein the risk report is populated with an unsafe conditions indicator based upon the effect, of the waste facility accepting the waste item, upon waste temperature changes, air quality changes, a water contamination probability, or a spillage probability.

2. The method of claim 1, comprising:
transmitting the electronic waste transfer message over a network communication to a second device associated with a second user of the waste exchange platform interface, wherein the second user is associated with the first selectable waste option.

3. The method of claim 2, comprising:
receiving a transaction request, from the second device, via the waste exchange platform interface;
responsive to receiving the transaction request, generating an electronic transaction message comprising transaction information associated with the first selectable waste option; and
transmitting the electronic transaction message over a network communication to the device.

4. The method of claim 3, comprising:
storing the one or more parameters and the transaction information in the waste information aggregation database; and
analyzing the waste information aggregation database to generate a waste report.

5. The method of claim 1, wherein each selectable waste option of the list of selectable waste options comprises at least one of a name of a company, a location, a rating of the company, financial requirements, parameters for disposal of waste or one or more second types of raw materials.

6. The method of claim 1, wherein the one or more parameters identify one or more types of waste, wherein each selectable waste option of the list of selectable waste options corresponds to at least one of a waste facility, a waste service or a waste product.

7. The method of claim 1, comprising:
providing the waste exchange platform interface as one side of a multi-sided marketplace; and
providing a second waste exchange platform interface to a second device as a second side of the multi-sided marketplace.

8. A computing device, comprising:
a memory comprising instructions; and
a processor coupled to the memory, the processor configured to execute the instructions to perform operations comprising:
extracting data records, comprising data associated with waste, from a plurality of waste information databases;
formatting each of the data records, in accordance with a first format associated with a waste information aggregation database, by scrubbing and converting the data records to generate a formatted set of data, wherein the scrubbing comprises amending or removing elements of the data records identified as being incorrect, incomplete, improperly formatted, or duplicated, and wherein the formatting comprises converting between units of measurements;
storing the formatted set of data in the waste information aggregation database;
controlling a graphical user interface to display a waste exchange platform interface comprising one or more selectable inputs;
receiving, via the waste exchange platform interface, a request for a list of selectable waste options from a device associated with a user of the waste exchange platform interface, wherein the request comprises one or more parameters received via the one or more selectable inputs;

analyzing the formatted set of data in the waste information aggregation database to identify waste items based upon the one or more parameters;

generating and transmitting the list of selectable waste options, corresponding to the waste items, to the device; and in response to receiving a selection of a first selectable waste option from the list of selectable waste options, generating an electronic waste transfer message based upon the first selectable waste option, wherein the generating comprise:

populating the electronic waste transfer message with shipping information automatically derived from a waste profile; and populating the electronic waste transfer message with a risk report indicating an effect upon a waste facility if the waste facility accepts a waste item associated with the first selectable waste option, wherein the risk report is populated with an unsafe conditions indicator based upon the effect, of the waste facility accepting the waste item, upon waste temperature changes, air quality changes, a water contamination probability, or a spillage probability.

9. The computing device of claim 8, the operations comprising:

transmitting the electronic waste transfer message over a network communication to a second device associated with a second user of the waste exchange platform interface, wherein the second user is associated with the first selectable waste option.

10. The computing device of claim 9, the operations comprising:

receiving a transaction request, from the second device, via the waste exchange platform interface;

responsive to receiving the transaction request, generating an electronic transaction message comprising transaction information associated with the first selectable waste option; and transmitting the electronic transaction message over a network communication to the device.

11. The computing device of claim 10, the operations comprising:

storing the one or more parameters and the transaction information in the waste information aggregation database; and analyzing the waste information aggregation database to generate a waste report.

12. The computing device of claim 8, the operations comprising:

providing the waste exchange platform interface as one side of a multi-sided marketplace; and providing a second waste exchange platform interface to a second device as a second side of the multi-sided marketplace.

13. The computing device of claim 8, wherein each selectable waste option of the list of selectable waste options comprises at least one of a name of a company, a location, a rating of the company, financial requirements, parameters for disposal of waste or one or more second types of raw materials.

14. The computing device of claim 8, wherein the one or more parameters identify one or more types of waste, wherein each selectable waste option of the list of selectable waste options corresponds to at least one of a waste facility, a waste service or a waste product.

15. A non-transitory machine readable medium comprising instructions, which when executed by a machine, causes the machine to perform operations, comprising:

extracting data records, comprising data associated with waste, from a plurality of waste information databases;

formatting each of the data records, in accordance with a first format associated with a waste information aggregation database, by scrubbing and converting the data records to generate a formatted set of data, wherein the scrubbing comprises amending or removing elements of the data records identified as being incorrect, incomplete, improperly formatted, or duplicated, and wherein the formatting comprises converting between units of measurements;

storing the formatted set of data in the waste information aggregation database;

controlling a graphical user interface to display a waste exchange platform interface comprising one or more selectable inputs;

receiving, via the waste exchange platform interface, a request for a list of selectable waste options from a device associated with a user of the waste exchange platform interface, wherein the request comprises one or more parameters received via the one or more selectable inputs;

analyzing the formatted set of data in the waste information aggregation database to identify waste items based upon the one or more parameters;

generating and transmitting the list of selectable waste options, corresponding to the waste items, to the device; and in response to receiving a selection of a first selectable waste option from the list of selectable waste options, generating an electronic waste transfer message based upon the first selectable waste option, wherein the generating comprise:

populating the electronic waste transfer message with shipping information automatically derived from a waste profile; and populating the electronic waste transfer message with a risk report indicating an effect upon a waste facility if the waste facility accepts a waste item associated with the first selectable waste option, wherein the risk report is populated with an unsafe conditions indicator based upon the effect, of the waste facility accepting the waste item, upon waste temperature changes, air quality changes, a water contamination probability, or a spillage probability.

16. The non-transitory machine readable medium of claim 15, the operations comprising:

transmitting the electronic waste transfer message over a network communication to a second device associated with a second user of the waste exchange platform interface, wherein the second user is associated with the first selectable waste option.

17. The non-transitory machine readable medium of claim 16, the operations comprising:

receiving a transaction request, from the second device, via the waste exchange platform interface;

responsive to receiving the transaction request, generating an electronic transaction message comprising transaction information associated with the first selectable waste option; and transmitting the electronic transaction message over a network communication to the device.

18. The non-transitory machine readable medium of claim 17, the operations comprising:
- storing the one or more parameters and the transaction information in the waste information aggregation database; and
- analyzing the waste information aggregation database to generate a waste report.

19. The non-transitory machine readable medium of claim 15, the operations comprising:
- providing the waste exchange platform interface as one side of a multi-sided marketplace; and
- providing a second waste exchange platform interface to a second device as a second side of the multi-sided marketplace.

20. The non-transitory machine readable medium of claim 15, wherein each selectable waste option of the list of selectable waste options comprises at least one of a name of a company, a location, a rating of the company, financial requirements, parameters for disposal of waste or one or more second types of raw materials.

\* \* \* \* \*